(12) United States Patent
Park et al.

(10) Patent No.: US 8,619,876 B2
(45) Date of Patent: Dec. 31, 2013

(54) METHOD FOR TURBO TRANSMISSION OF DIGITAL BROADCASTING TRANSPORT STREAM, A DIGITAL BROADCASTING TRANSMISSION AND RECEPTION SYSTEM, AND A SIGNAL PROCESSING METHOD THEREOF

(75) Inventors: Eui-jun Park, Seoul (KR); Yong-sik Kwon, Seoul (KR); Jung-pil Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1600 days.

(21) Appl. No.: 11/416,253

(22) Filed: May 3, 2006

(65) Prior Publication Data

US 2007/0094566 A1   Apr. 26, 2007

Related U.S. Application Data

(60) Provisional application No. 60/724,786, filed on Oct. 11, 2005.

(30) Foreign Application Priority Data

Nov. 25, 2005 (KR) .............................. 2005-113662

(51) Int. Cl.
   *H04N 7/18*   (2006.01)
(52) U.S. Cl.
   USPC ............. 375/240.27; 375/240.26; 375/240.25
(58) Field of Classification Search
   USPC ........................ 375/240.01–240.29
   See application file for complete search history.

(56) References Cited

U.S. PATENT DOCUMENTS

| | | | |
|---|---|---|---|
| 6,816,556 B2 | 11/2004 | Kim | |
| 7,680,108 B2 * | 3/2010 | Yu et al. | 370/389 |
| 7,706,334 B2 | 4/2010 | Yun et al. | |
| 7,711,045 B2 * | 5/2010 | Park et al. | 375/240.01 |

(Continued)

FOREIGN PATENT DOCUMENTS

| | | |
|---|---|---|
| CN | 1306367 A | 8/2001 |
| CN | 1378395 A | 11/2002 |

(Continued)

OTHER PUBLICATIONS

Search Report issued on Jan. 15, 2007 by the Korean International Property Office for International Patent Application No. PCT/KR2006/004086 filed on Oct. 11, 2006.

(Continued)

*Primary Examiner* — Andy Rao
(74) *Attorney, Agent, or Firm* — Sughrue Mion, PLLC

(57) ABSTRACT

A digital broadcasting transmission/reception system, and a signal processing method thereof for turbo-processing digital broadcasting transport stream and transmitting the processed stream, includes a parity area generating unit preparing a first area for parity insertion with respect to a dual transport stream (TS) which includes a normal stream and a turbo stream as multiplexed, a first interleaver interleaving the dual TS which is transmitted from the parity area generating unit, a turbo processing unit detecting the turbo stream from the interleaved dual TS, exclusively encoding the detected turbo stream for turbo-processing, and stuffing the encoded turbo stream into the dual TS, a deinterleaver deinterleaving the dual TS which is processed by the turbo processing unit, and a transmitting unit transmitting the dual TS which is processed at the deinterleaver.

61 Claims, 18 Drawing Sheets

(56) References Cited

U.S. PATENT DOCUMENTS

| | | | |
|---|---|---|---|
| 7,747,930 B2* | 6/2010 | Pekonen et al. | 714/784 |
| 2001/0010710 A1 | 8/2001 | Kim | |
| 2002/0056065 A1 | 5/2002 | Jung et al. | |
| 2002/0194570 A1 | 12/2002 | Birru et al. | |
| 2003/0099303 A1 | 5/2003 | Birru et al. | |
| 2004/0057535 A1 | 3/2004 | Strolle et al. | |
| 2005/0097428 A1 | 5/2005 | Chang et al. | |
| 2005/0141606 A1 | 6/2005 | Choi et al. | |
| 2007/0230387 A1 | 10/2007 | Roh et al. | |
| 2008/0043777 A1 | 2/2008 | Yun et al. | |
| 2010/0208835 A1 | 8/2010 | Miyahara | |

FOREIGN PATENT DOCUMENTS

| | | | |
|---|---|---|---|
| CN | 1524360 A | 8/2004 | |
| CN | 1582580 A | 2/2005 | |
| EP | 1496638 A2 | 1/2005 | |
| WO | 0189139 A1 | 11/2001 | |
| WO | WO 0203678 A2 | 1/2002 | |
| WO | 0241550 A1 | 5/2002 | |
| WO | WO 2007/043803 A1 | 4/2007 | |
| WO | WO 2007/091809 A1 | 8/2007 | |
| WO | WO 2008/050532 A1 | 5/2008 | |

OTHER PUBLICATIONS

International Search Report mailed on Jan. 15, 2007, in International Application No. PCT/KR2006/004086.

Written Opinion of the International Searching Authority mailed on Jan. 15, 2007, in International Application No. PCT/KR2006/004086.

U.S. Appl. No. 11/416,259, filed May 3, 2006, Eui-jun Park et al., Samsung Electronics Co., Ltd.

U.S. Appl. No. 12/256,917, filed Oct. 23, 2008, Eui-jun Park et al., Samsung Electronics Co., Ltd.

U.S. Appl. No. 12/256,846, filed Oct. 23, 2008, Eui-jun Park et al., Samsung Electronics Co., Ltd.

U.S. Appl. No. 12/261,231, filed Oct. 30, 2008, Eui-jun Park et al., Samsung Electronics Co., Ltd.

U.S. Appl. No. 12/261,245, filed Oct. 30, 2008, Eui-jun Park et al., Samsung Electronics Co., Ltd.

U.S. Appl. No. 12/261,258, filed Oct. 30, 2008, Eui-jun Park et al., Samsung Electronics Co., Ltd.

Office Action issued Aug. 28, 2009, in corresponding Chinese Patent Application No. 200680036245.3.

Examination Report issued by the Intellectual Property Corporation of Malaysia on Sep. 15, 2011 in the corresponding Malaysian Patent Application No. PI20094216.

Examination Report issued by the Intellectual Property Corporation of Malaysia on Sep. 15, 2011 in the corresponding Malaysian Patent Application No. PI20094218.

Communication dated Dec. 9, 2011 issued by the State Intellectual Property Office of P.R. China in counterpart Chinese Patent Application No. 200910179530.6.

Communication dated Jan. 15, 2013 issued by The State Intellectual Property Office of P.R. China in counterpart Chinese Application No. 200910179529.3.

Communication dated May 9, 2012 issued by the Canadian Intellectual Property Office in counterpart Canadian Patent Application No. 2684435.

Communication dated May 8, 2012 issued by the Canadian Intellectual Property Office in counterpart Canadian Patent Application No. 2684432.

Communication dated Mar. 2, 2012 issued by the Mexican Patent Office in counterpart Mexican Patent Application No. MX/a/2008/004772.

* cited by examiner

FIG. 9A

| SYNC | PID | Robust Data |
|------|-----|-------------|
| 1 | 3 | |

FIG. 9B

| SYNC | PID | AF Header | Null data | Normal Data |
|------|-----|-----------|-----------|-------------|
| 1 | 3 | 2 | N | 182-N |

FIG. 9C

| SYNC | PID | AF Header | Robust Data | Normal Data |
|------|-----|-----------|-------------|-------------|
| 1 | 3 | 2 | N | 182-N |

FIG. 9D

| 1 | 3 | 184 |
|---|---|-----|
| SYNC | PID | Robust Data |
| SYNC | PID | Normal Data |
| SYNC | PID | Normal Data |
| SYNC | PID | Normal Data |

FIG. 9E

| 1 | 3 | 184 |
|---|---|---|
| SYNC | PID | Robust Data |
| SYNC | PID | Robust Data |
| SYNC | PID | Normal Data |
| SYNC | PID | Normal Data |

FIG. 9F

| 1 | 3 | 2 | 184 | |
|---|---|---|---|---|
| SYNC | PID | \multicolumn{3}{c}{Robust Data} | |
| SYNC | PID | AF Header | Robust Data | Normal Data |
| SYNC | PID | \multicolumn{3}{c}{Normal Data} | |
| SYNC | PID | \multicolumn{3}{c}{Normal Data} | |

FIG. 11A

| SYNC | PID | Robust Data |
|---|---|---|
| 1 | 3 | |

FIG. 11B

| SYNC | PID | AF Header | SRS (Supplementary Reference Sequence) | Null data | Normal Data |
|---|---|---|---|---|---|
| 1 | 3 | 2 | s | N | 182-N-S |

FIG. 11C

| SYNC | PID | AF Header | SRS (Supplementary Reference Sequence) | Robust Data | Normal Data |
|---|---|---|---|---|---|
| 1 | 3 | 2 | S | N | 182-N-S |

FIG. 11D

| 1 | 3 | 2 | S | 182-S |
|---|---|---|---|---|
| SYNC | PID | AF Header | SRS (Supplementary Reference Sequence) | Robust Data |
| SYNC | PID | AF Header | SRS (Supplementary Reference Sequence) | Normal Data |
| SYNC | PID | AF Header | SRS (Supplementary Reference Sequence) | Normal Data |
| SYNC | PID | AF Header | SRS (Supplementary Reference Sequence) | Normal Data |

FIG. 11E

| 1 | 3 | 2 | S | 182-S |
|---|---|---|---|---|
| SYNC | PID | AF Header | SRS (Supplementary Reference Sequence) | Robust Data |
| SYNC | PID | AF Header | SRS (Supplementary Reference Sequence) | Robust Data |
| SYNC | PID | AF Header | SRS (Supplementary Reference Sequence) | Normal Data |
| SYNC | PID | AF Header | SRS (Supplementary Reference Sequence) | Normal Data |

FIG. 11F

| 1 | 3 | 2 | S | 182-S | |
|---|---|---|---|---|---|
| SYNC | PID | AF Header | SRS (Supplementary Reference Sequence) | Robust Data | |
| SYNC | PID | AF Header | SRS (Supplementary Reference Sequence) | Robust Data | Normal Data |
| SYNC | PID | AF Header | SRS (Supplementary Reference Sequence) | Normal Data | |
| SYNC | PID | AF Header | SRS (Supplementary Reference Sequence) | Normal Data | |

METHOD FOR TURBO TRANSMISSION OF DIGITAL BROADCASTING TRANSPORT STREAM, A DIGITAL BROADCASTING TRANSMISSION AND RECEPTION SYSTEM, AND A SIGNAL PROCESSING METHOD THEREOF

CROSS-REFERENCE TO RELATED APPLICATIONS

This application claims the benefit of U.S. Provisional Application No. 60/724,786, filed on Oct. 11, 2005 in the United States Patent and Trademark Office, and Korean Patent Application No. 2005-113662, filed on Nov. 25, 2005 in the Korean Intellectual Property Office, the disclosures of which are incorporated herein by reference in their entirety.

BACKGROUND OF THE INVENTION

1. Field of the Invention

Aspects of the invention relate to a method for turbo processing and transmitting a digital broadcasting transport stream, a digital broadcasting reception and transmission system, and a method of processing signals thereof. More particularly, aspects of the invention relate to a method for turbo processing and transmitting a digital broadcasting transport stream to enhance reception performance of a terrestrial-wave digital television (DTV) system in the U.S. in accordance with the Advanced Television Systems Committee (ATSC) vestigial sideband (VSB) transmission system through information exchange and mapping with respect to a dual transport stream (TS) which includes normal data and turbo data, and a digital broadcasting transmission and reception system.

2. Description of the Related Art

The Advanced Television Systems Committee (ATSC) vestigial sideband (VSB) transmission system, which is used in a terrestrial-wave digital television (DTV) system in the U.S., is a single-carrier system that transmits one field synchronization (sync) segment for each unit of 312 data segments. Therefore, reception performance of the ATSC VSB system is inferior over weak channels, especially over a Doppler-fading channel.

FIG. 1 is a block diagram of an ATSC VSB digital broadcasting transceiver of the related art. The digital broadcasting transceiver shown in FIG. 1 is configured in accordance with an enhanced VSB (E-VSB) system proposed by Phillips, and produces and transmits a dual stream configured by adding enhanced or robust data to normal data of the standard ATSC VSB system.

As shown in FIG. 1, a digital broadcasting transmitter includes a randomizer 11, a Reed-Solomon (RS) encoder 12 having a concatenated encoder form adding parity bytes to a dual transport stream to enable errors generated by channel impairments during transmission to be corrected during reception, an interleaver 13 interleaving the RS-encoded data according to a predetermined pattern, and a ⅔ rate trellis encoder 14 performing trellis-encoding at a rate of ⅔ with respect to the interleaved data and mapping the interleaved data to 8-level symbols. With this structure, the digital broadcasting transmitter performs error-correction encoding with respect to the dual stream.

The digital broadcasting transmitter further includes a multiplexer 15 inserting field synchronization (sync) and segment sync in the error-correction encoded data according to a data format shown in FIG. 2, and a modulator 16 inserting a pilot by adding a predetermined direct current (DC) value to the data symbols and the inserted segment sync and field sync, amplitude-modulating the resulting signal onto an intermediate frequency (IF) carrier, filtering the resulting IF signal to produce a vestigial sideband (VSB) signal, up-converting the VSB signal to a radio-frequency (RF) signal having a frequency of a desired channel, and transmitting the RF signal through the channel.

Accordingly, in the digital broadcasting transmitter, the normal data and the enhanced or robust data are multiplexed according to the dual stream system that transmits the normal data and the enhanced or robust data on one channel and are inputted to the randomizer 11. The inputted data is randomized by the randomizer 11, and the randomized data is outer-encoded by the RS encoder 12 which is an outer encoder. The interleaver 13 distributes the encoded data according to the predetermined pattern. The interleaved data is inner-encoded by the trellis encoder 14 in 12-symbol units. The inner-encoded data is mapped to 8-level symbols. The field sync and the segment sync are inserted in the mapped data. The pilot is inserted and the VSB modulation is performed. The VSB signal is up-converted to the RF signal, and the RF signal is transmitted through the channel.

A digital broadcasting receiver shown in FIG. 1 includes a tuner (not shown) converting the RF signal received through the channel to a baseband signal, a demodulator 21 performing synchronization detection and demodulation with respect to the baseband signal, an equalizer 22 compensating for channel distortion generated by multiple transmission paths with respect to the demodulated signal, a Viterbi decoder 23 correcting errors of the equalized signal and decoding the error-corrected signal to symbol data, a deinterleaver 24 rearranging the symbol data according to the predetermined pattern by which data was distributed by the interleaver 13 of the digital broadcasting transmitter, an RS decoder 25 correcting errors, and a derandomizer 26 derandomizing the data corrected by the RS decoder 25 and outputting an MPEG-2 (Moving Picture Experts Group) transport stream. Therefore, the digital broadcasting receiver of FIG. 1 down-converts the RF signal to the baseband signal in a reverse order relative to the digital broadcasting transmitter, demodulates and equalizes the converted signal, and performs channel-decoding, thereby recovering the original signal.

FIG. 2 shows a VSB data frame where the segment sync and the field sync are inserted according to an 8-VSB system which is used in the DTV system in the U.S. As shown in FIG. 2, one frame includes two fields. One field includes one field sync segment which is a first segment of the field, and 312 data segments. In the VSB data frame, one segment corresponding to one MPEG-2 packet comprises a 4-symbol segment sync and 828 data symbols. The segment sync and the field sync in FIG. 2 are used for synchronization and equalization in the digital broadcasting receiver. More specifically, the segment sync and the field sync, which are known to the digital broadcasting transmitter and receiver, are used as reference signals when the receiver performs synchronization and equalization. The U.S. terrestrial-wave digital broadcasting system of FIG. 1 is configured to produce and transmit the dual stream by adding the enhanced or robust data to the normal data of the ATSC VSB system of the related art. Therefore, the U.S. terrestrial-wave digital broadcasting system transmits the enhanced or robust data as well as the normal data.

Although the enhanced or robust data is transmitted in the dual stream in addition to the normal data, inferior reception performance due to multipath channel distortion caused by transmission of the normal data stream is not remarkably improved. In fact, almost no improvement in the reception performance is obtained by the improved normal data stream. Moreover, reception performance is not much improved with respect to the enhanced or robust stream, either.

SUMMARY OF THE INVENTION

Accordingly, an aspect of the invention is to provide a method for turbo processing and transmitting a digital broadcasting transport stream to enhance reception performance of a terrestrial-wave digital television (DTV) in the US in accordance with the advanced television system committee (ATSC) vestigial sideband (VSB) through information exchange and mapping with respect to a dual transport stream (TS) which includes normal data and turbo data, a digital broadcasting transmission and reception system, and a signal-processing method thereof.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of embodiments of the invention, taken in conjunction with the accompanying drawings, of which:

FIGS. 9A through 9G show exemplary structures of a dual transport stream packet of the digital broadcasting transmission system of FIG. 4;

FIGS. 11A through 11G show exemplary structures of a dual transport stream packet including the supplementary reference sequence (SRS) of the digital broadcasting transmission system of FIG. 10;

DETAILED DESCRIPTION OF THE EMBODIMENTS

Figure 1:
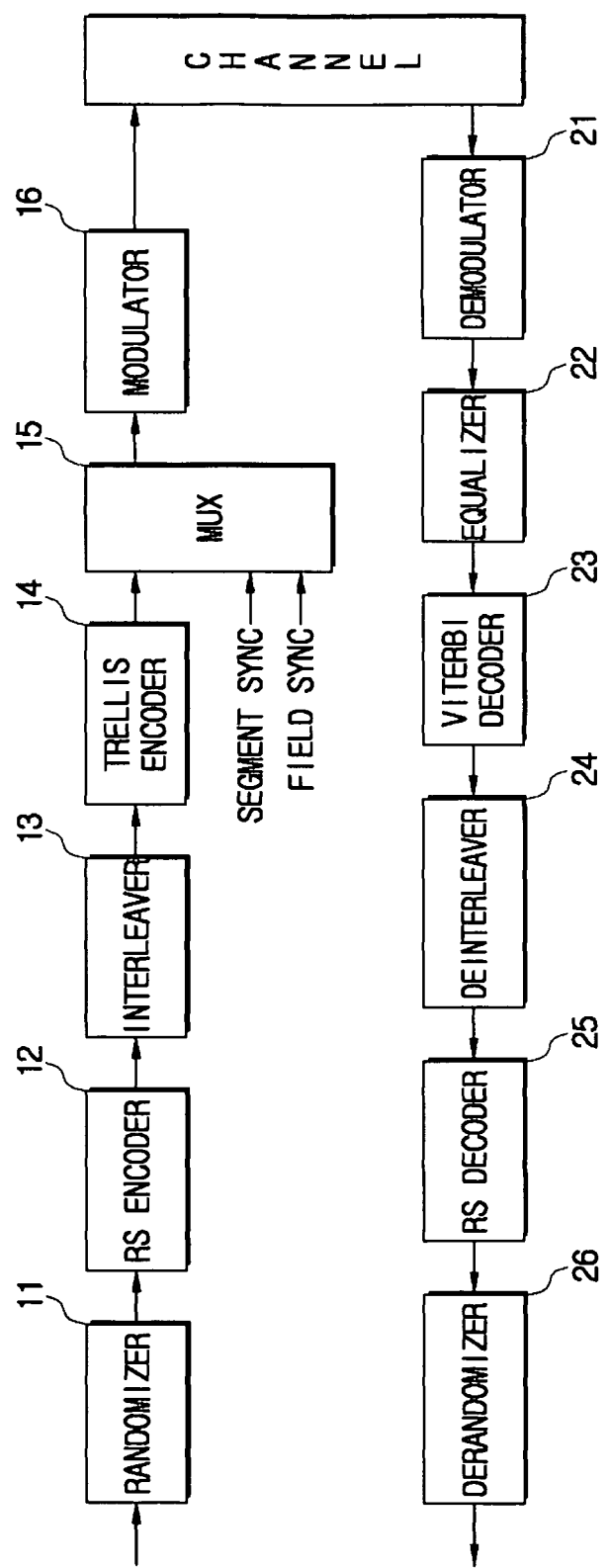
FIG. 1 is a block diagram showing a digital broadcasting transceiver of the related art according to the Advanced Television Systems Committee (ATSC) vestigial sideband (VSB) system.
Figure 2:
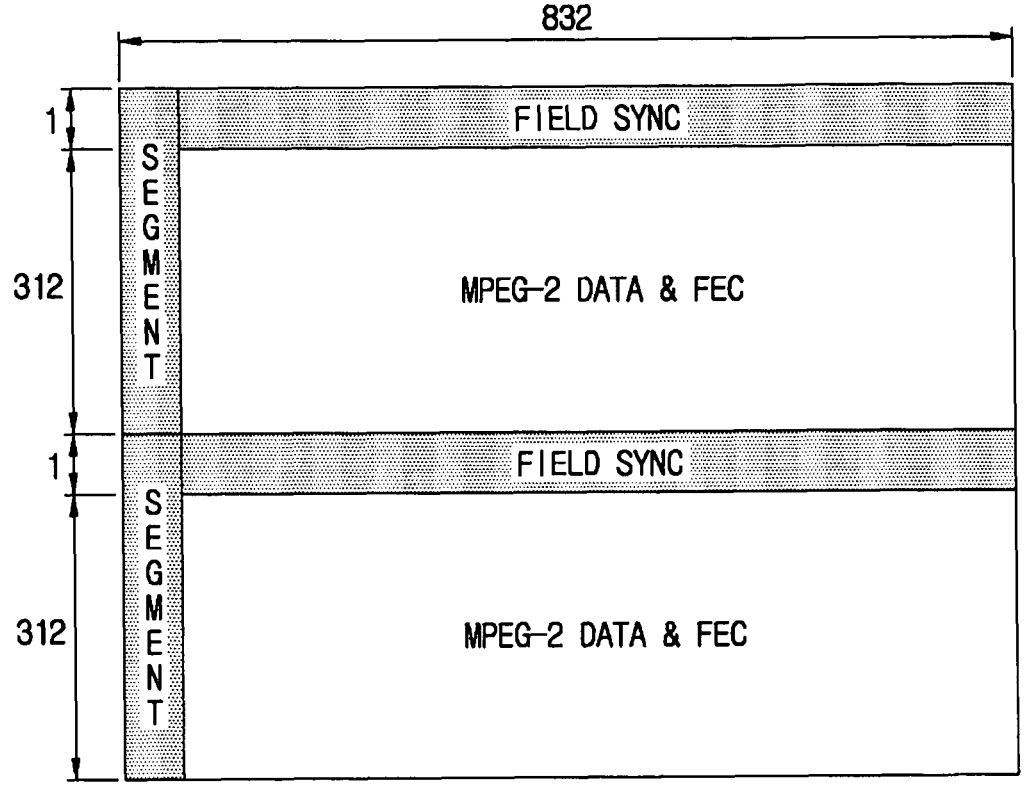
FIG. 2 shows an exemplary frame structure of a VSB data frame used in the digital broadcasting transceiver of the related art shown in FIG. 1.

Reference will now be made in detail to embodiments of the invention, examples of which are shown in the accompanying drawings, wherein like reference numerals refer to like elements throughout. The embodiments are described below in order to explain the invention by referring to the figures. The specific structures and elements in the following description are merely to assist in obtaining a comprehensive understanding of the invention. Thus, it is apparent that the invention can be implemented without using these specific structures and elements. Also, well-known functions, structures, and elements have not been described in detail in the following description to avoid obscuring the invention with unnecessary details.

The following description presumes a familiarity with the Advanced Television Systems Committee (ATSC) Digital Television (DTV) System which incorporates aspects of the MPEG-2 system, details of which are described in the corresponding standards. Examples of such standards which may be relevant are ATSC A/52B, Digital Audio Compression Standard (AC-3, E-AC-3), Revision B, 14 Jun. 2005; ATSC A/53E, ATSC Digital Television Standard (A/53), Revision E, 27 Dec. 2005; ATSC A/54A, Recommended Practice: Guide to the Use of the ATSC Digital Television Standard, 4 Dec. 2003; ISO/IEC IS 13818-1:2000(E), Information technology—Generic coding of moving pictures and associated audio information: Systems (second edition) (MPEG-2); and ISO/IEC IS 13818-2:2000(E), Information technology—Generic coding of moving pictures and associated audio information: Video (second edition) (MPEG-2), the contents and disclosures of which are incorporated herein by reference. However, it is understood that aspects of the invention can be implemented according to other standards and systems without restriction. Moreover, the following description uses the terms "turbo" and "turbo data" which are represented in some of the drawings by the terms "robust" and "robust data".

Figure 3:
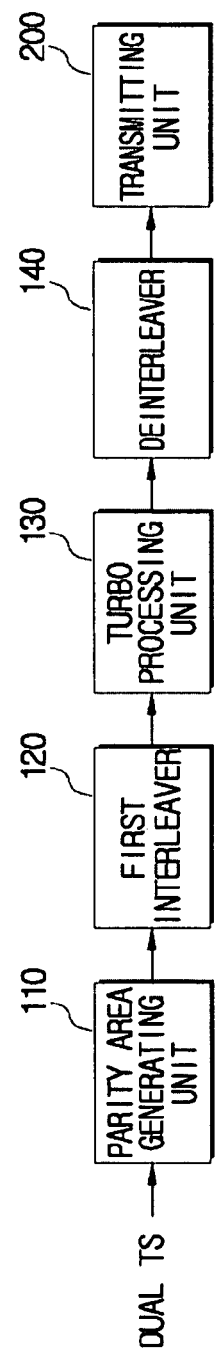
FIG. 3 is a block diagram showing a digital broadcasting transmission system according to an embodiment of the invention.

FIG. 3 is a block diagram showing a digital broadcasting transmission system according to an embodiment of the invention. Referring to FIG. 3, the digital broadcasting transmission system includes a parity area generating unit 110, a first interleaver 120, a turbo processing unit 130, a deinterleaver 140, and a transmitting unit 150. The parity area generating unit 110 provides an area for the insertion of parity bytes in a dual transport stream (TS), which includes a normal stream and a turbo stream. In other words, the parity is computed with respect to the dual TS, and inserted (that is, recorded in bits) into the parity area. The parity area provided by the parity area generating unit 110 will be called "a first parity insertion area" in the following description.

The first interleaver 120 interleaves the dual TS which has an area provided by the parity area generating unit 110 for parity insertion. The turbo processing unit 130 detects the turbo stream included in the interleaved dual TS, turbo-processes the detected turbo TS, and stuffs the dual TS. While not required in all aspects, it is understood that the turbo processing of the turbo processing unit 130 may include encoding processes such as convolution encoding with respect to the turbo TS to make the data turbo.

The deinterleaver 140 deinterleaves the dual TS outputted from the turbo processing unit 130. The transmitting unit 200 transmits the dual TS after it has been processed in the deinterleaver 140. The structure of the transmitting unit 200 will be described below in detail.

According to the embodiment shown in FIG. 3, a turbo stream, which has been treated with a separate turbo processing, is transmitted together with the normal stream. Therefore, reception performance under multipath conditions or in a mobile environment improves, and at the same time, compatibility with existing normal stream transmission/reception system is provided. It is further understood that the turbo data can be various forms of data, such as audio, video, computer software, game data, music, shopping information, internet data, text, voice data, and other types of data transmitted in addition to the normal data. Additionally, the normal data can include other data in addition to or instead of the audio-video data used in digital broadcasting according to aspects of the invention.

Figure 4:
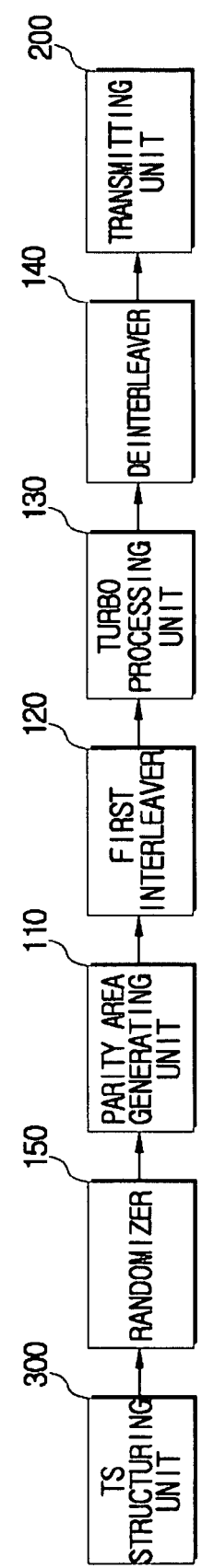
FIG. 4 is a block diagram provided to explain in detail the structure of the digital broadcasting transmission system of FIG. 3.

The digital broadcasting transmission system of FIG. 3 will be explained in greater detail below with reference to the block diagram of FIG. 4. Referring to FIG. 4, the digital broadcasting transmission system further includes a transport stream (TS) generating unit 300 and a randomizer unit 150. The TS generating unit 300 generates a dual TS by receiving a normal stream and a turbo stream, processing the turbo stream, and multiplexing the normal stream and the processed turbo stream. While not required in all aspects, the normal stream and the turbo stream may be received from an external module such as a broadcasting camera, or internal modules such as compression module such as MPEG-2 module, a video encoder, and an audio encoder.

The randomizer unit 150 randomizes the dual TS generated by the TS generating unit 300 and provides it to the parity area generating unit 110. Accordingly, the parity area generating unit 110 provides a parity area for the dual TS. Since the elements in FIG. 4 other than the TS generating unit 300 and the randomizer unit 150 are same in function as those of the above-described embodiment of FIG. 3, additional description will be omitted for the sake of brevity.

Figure 5:
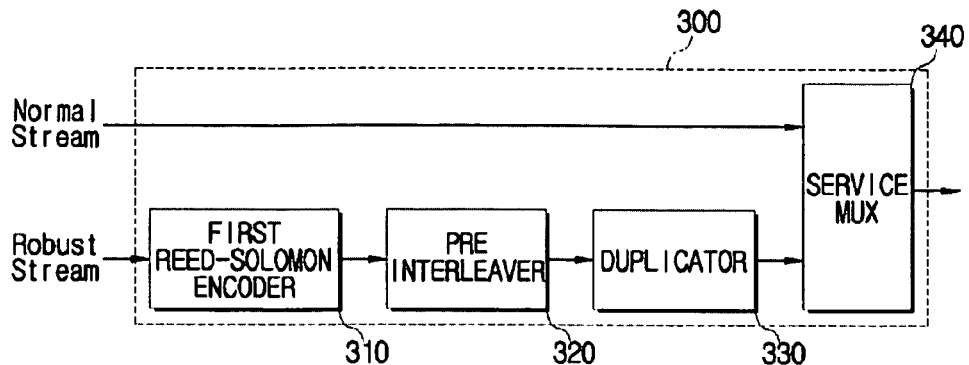
FIG. 5 is a block diagram showing a transport stream (TS) constructing unit of the digital broadcasting transmission system of FIG. 4.

An exemplary structure of the TS generating unit 300 will be described below with reference to FIG. 5. The TS generating unit 300 includes a first Reed-Solomon encoder 310, a pre-interleaver 320, a duplicator 330, and a service MUX (multiplexer) 340. Although the example shown in FIG. 5 uses the first Reed-Solomon encoder 310 and the pre-interleaver 320, these can be omitted or replaced with other elements (not shown). It is preferable, but not required, that the first Reed-Solomon encoder 310, when used, be used together with the pre-interleaver 320. The position of the pre-interleaver 320 is interchangeable with that of the duplicator 330.

The first Reed-Solomon encoder 310 performs encoding by adding parity bytes to the received turbo stream. The pre-interleaver 320 interleaves the turbo stream having the added parity bytes. The duplicator 330 provides a parity area with respect to the interleaved turbo stream. The parity area provided by the duplicator 330 will be called a "second parity area" in the following description.

In order to provide the second parity area, the byte, which is the basic unit of the turbo stream, is divided into two or four bytes. A part of bits of one byte, and null data such as 0, are then stuffed in each of the bytes. The area stuffed with the null data becomes the parity area.

The service MUX 340 multiplexes the normal stream which is separately received with the turbo stream processed in the duplicator 330. As the dual TS is generated, the service MUX 340 provides the dual TS to the randomizer unit 150.

Figure 6:
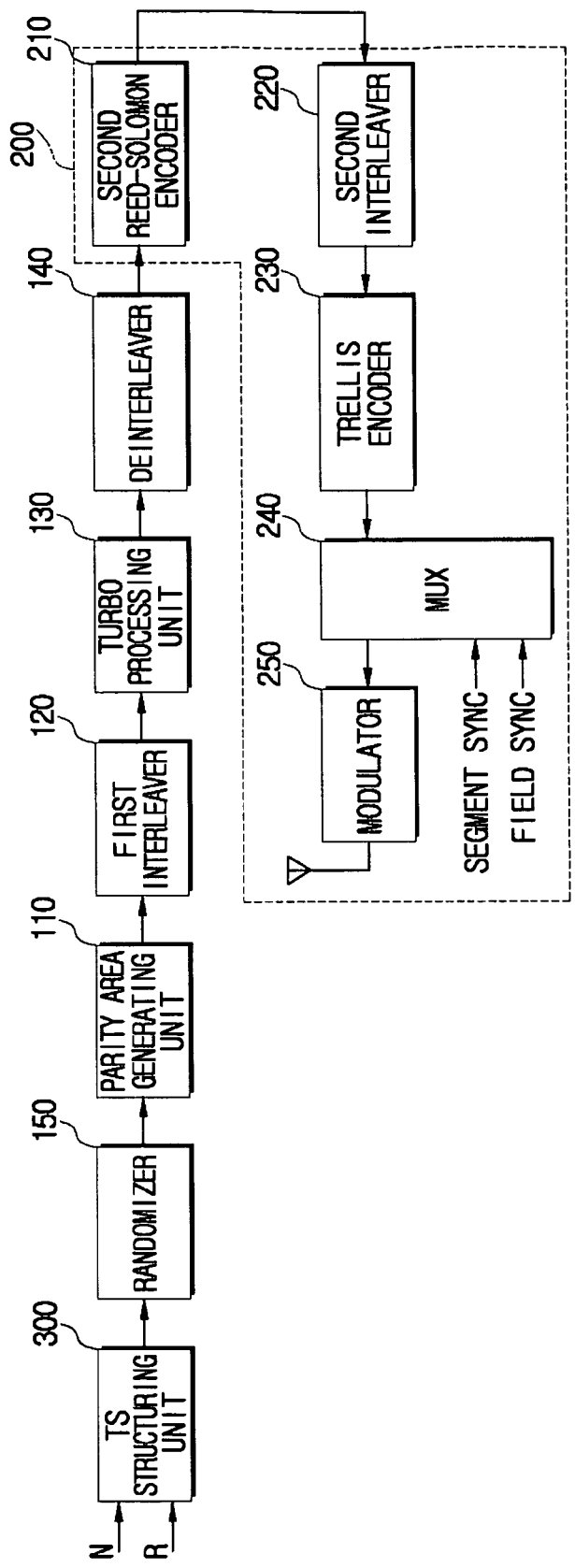
FIG. 6 is a block diagram showing in detail the structure of a transmitting unit of the digital broadcasting transmission system of FIG. 4.

An exemplary structure of the transmitting unit 200 of the digital broadcasting transmission system of FIG. 4 will be explained below with reference to the block diagram of FIG. 6. As shown in FIG. 6, the transmitting unit 200 includes a second Reed-Solomon encoder 210, a second interleaver 220, a trellis encoder 230, a MUX 240, and a modulator 250. The second Reed-Solomon encoder 210 encodes the dual TS received from the deinterleaver 140 by adding the parity bytes to the dual TS. More specifically, the second Reed-Solomon encoder 210 inserts parity bytes computed with respect to the dual TS in the first parity area provided by the parity area generating unit 110.

The second interleaver 220 interleaves the dual TS having the added parity bytes added by the second Reed-Solomon encoder 210. The trellis encoder 230 encodes the dual TS after the dual TS is interleaved by the second interleaver 220. The MUX 240 multiplexes the dual TS after the trellis encoding by adding segment sync and field sync to the dual TS. The modulator 250 modulates channel of the dual TS after the multiplexing, and up-converts into a signal of RF channel band. Accordingly, the dual TS is transmitted to a variety of reception systems via the channel. Although not shown in FIG. 6 and while not required in all aspects, the transmission unit 200 may additionally include general components for the signal transmission, such as a power amplifier (not shown) which amplifies the power of the modulated signal of the modulator 250, and an antenna (not shown), and may further include elements used to broadcast within cable, internet, and/or satellite systems and media through which digital broadcasts can be implemented.

Figure 7:
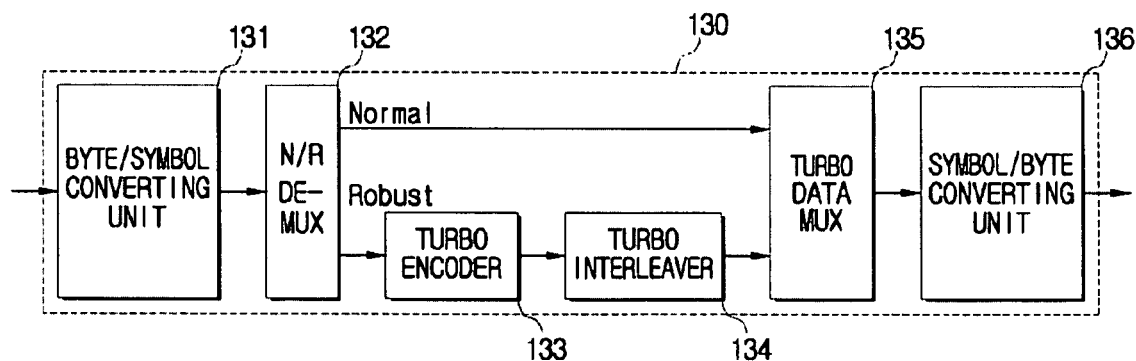
FIG. 7 is a block diagram showing an example of a turbo processing unit of the digital broadcasting transmission system of FIG. 4.

An exemplary structure of the turbo processing unit 130 of the digital broadcasting transmission system of FIG. 4 will be explained below with reference to the block diagram of FIG. 7. With reference to FIG. 7, the turbo processing unit 130 includes a byte/symbol converting unit 131, a de-MUX 132, a turbo encoder 133, a turbo interleaver 134, a turbo data MUX 135, and a symbol/byte converting unit 136. The byte/symbol converting unit 131, the de-MUX 132, the turbo data MUX 135, and the symbol/byte converting unit 136 may be omitted, or replaced with other components in other aspects of the invention.

The byte/symbol converting unit 131 converts the basic unit of the interleaved dual TS of the first interleaver 120 from bytes to symbols. Conversion of the basic unit from byte to symbol will be easily understood with reference to the table D5.2 of U.S. ATSC DTV standard (A/53), the contents of which are incorporated herein by reference in their entirety.

The de-MUX 132 demultiplexes the dual TS of symbol unit to recover the turbo stream. The turbo encoder 133 computes parity bytes with respect to the detected turbo stream, and encodes the turbo stream by stuffing the second parity area with the computed parity bytes. In this particular example, the turbo encoder 133 performs encoding in the unit of each byte of the turbo stream. However, it is understood that other units can be used.

The turbo interleaver 134 interleaves the turbo stream which is convolution-encoded. In this example, the turbo interleaver 134 interleaves in the unit of bit. The turbo data MUX 135 generates a dual TS by multiplexing the interleaved turbo stream and the normal stream. More specifically, the turbo data MUX 135 constructs a dual TS by stuffing the turbo stream to the place before it is detected by the de-MUX 132. The symbol/byte converting unit 136 converts the basic unit of the dual TS from symbols to bytes. This conversion will be easily understood with reference to the table D5.2 of the U.S. ATSC DTV standard (A/53), the disclosure of which is incorporated by reference.

An example of the byte-to-symbol table of table D5.2 is as follows:

particularly, the turbo stream packet comprises 1 byte of sync which is a header, 3 bytes of packet identity (PID), and 184 bytes of turbo data.

FIG. 9B shows an example of a normal stream packet received by the TS structure unit 300. The normal stream packet may comprise 188 bytes, more particularly, 1 byte of

|         | Segment 0 | | | Segment 1 | | | Segment 2 | | | Segment 3 | | | Segment 4 | | |
|---------|---------|------|------|---------|------|------|---------|------|------|---------|------|------|---------|------|------|
| Symbol  | Trellis | Byte | Bits | Trellis | Byte | Bits | Trellis | Byte | Bits | Trellis | Byte | Bits | Trellis | Byte | Bits |
| 0   | 0  | 0   | 7, 6 | 4  | 208 | 5, 4 | 8  | 412 | 3, 2 | 0  | 616 | 1, 0 | 4   | 828 | 7, 6 |
| 1   | 1  | 1   | 7, 6 | 5  | 209 | 5, 4 | 9  | 413 | 3, 2 | 1  | 617 | 1, 0 | 5   | 829 | 7, 6 |
| 2   | 2  | 2   | 7, 6 | 6  | 210 | 5, 4 | 10 | 414 | 3, 2 | 2  | 618 | 1, 0 | 6   | 830 | 7, 6 |
| 3   | 3  | 3   | 7, 6 | 7  | 211 | 5, 4 | 11 | 415 | 3, 2 | 3  | 619 | 1, 0 | ... | ... | ... |
| 4   | 4  | 4   | 7, 6 | 8  | 212 | 5, 4 | 0  | 416 | 3, 2 | 4  | 620 | 1, 0 | ... | ... | ... |
| 5   | 5  | 5   | 7, 6 | 9  | 213 | 5, 4 | 1  | 417 | 3, 2 | 5  | 621 | 1, 0 | ... | ... | ... |
| 6   | 6  | 6   | 7, 6 | 10 | 214 | 5, 4 | 2  | 418 | 3, 2 | 6  | 622 | 1, 0 | ... | ... | ... |
| 7   | 7  | 7   | 7, 6 | 11 | 215 | 5, 4 | 3  | 419 | 3, 2 | 7  | 623 | 1, 0 | ... | ... | ... |
| 8   | 8  | 8   | 7, 6 | 0  | 204 | 5, 4 | 4  | 408 | 3, 2 | 8  | 612 | 1, 0 | ... | ... | ... |
| 9   | 9  | 9   | 7, 6 | 1  | 205 | 5, 4 | 5  | 409 | 3, 2 | 9  | 613 | 1, 0 | ... | ... | ... |
| 10  | 10 | 10  | 7, 6 | 2  | 206 | 5, 4 | 6  | 410 | 3, 2 | 10 | 614 | 1, 0 | ... | ... | ... |
| 11  | 11 | 11  | 7, 6 | 3  | 207 | 5, 4 | 7  | 411 | 3, 2 | 11 | 615 | 1, 0 | ... | ... | ... |
| 12  | 0  | 0   | 5, 4 | 4  | 208 | 3, 2 | 8  | 412 | 1, 0 | 0  | 624 | 7, 6 | ... | ... | ... |
| 13  | 1  | 1   | 5, 4 | 5  | 209 | 3, 2 | 9  | 413 | 1, 0 | 1  | 625 | 7, 6 | ... | ... | ... |
| ...  | ... | ... | ... | ... | ... | ... | ... | ... | ... | ... | ... | ... | ... | ... | ... |
| 19  | 7  | 7   | 5, 4 | 11 | 215 | 3, 2 | 3  | 419 | 1, 0 | 7  | 631 | 7, 6 | ... | ... | ... |
| 20  | 8  | 8   | 5, 4 | 0  | 204 | 3, 2 | 4  | 408 | 1, 0 | 8  | 632 | 7, 6 | ... | ... | ... |
| 21  | 9  | 9   | 5, 4 | 1  | 205 | 3, 2 | 5  | 409 | 1, 0 | 9  | 633 | 7, 6 | ... | ... | ... |
| 22  | 10 | 10  | 5, 4 | 2  | 206 | 3, 2 | 6  | 410 | 1, 0 | 10 | 634 | 7, 6 | ... | ... | ... |
| 23  | 11 | 11  | 5, 4 | 3  | 207 | 3, 2 | 7  | 411 | 1, 0 | 11 | 635 | 7, 6 | ... | ... | ... |
| 24  | 0  | 0   | 3, 2 | 4  | 208 | 1, 0 | 8  | 420 | 7, 6 | 0  | 624 | 5, 4 | ... | ... | ... |
| 25  | 1  | 1   | 3, 2 | 5  | 209 | 1, 0 | 9  | 421 | 7, 6 | 1  | 625 | 5, 4 | ... | ... | ... |
| ...  | ... | ... | ... | ... | ... | ... | ... | ... | ... | ... | ... | ... | ... | ... | ... |
| 31  | 7  | 7   | 3, 2 | 11 | 215 | 1, 0 | 3  | 427 | 7, 6 | ... | ... | ... | ... | ... | ... |
| 32  | 8  | 8   | 3, 2 | 0  | 204 | 1, 0 | 4  | 428 | 7, 6 | ... | ... | ... | ... | ... | ... |
| 33  | 9  | 9   | 3, 2 | 1  | 205 | 1, 0 | 5  | 429 | 7, 6 | ... | ... | ... | ... | ... | ... |
| 34  | 10 | 10  | 3, 2 | 2  | 206 | 1, 0 | 6  | 430 | 7, 6 | ... | ... | ... | ... | ... | ... |
| 35  | 11 | 11  | 3, 2 | 3  | 207 | 1, 0 | 7  | 431 | 7, 6 | ... | ... | ... | ... | ... | ... |
| 36  | 0  | 0   | 1, 0 | 4  | 216 | 7, 6 | 8  | 420 | 5, 4 | ... | ... | ... | ... | ... | ... |
| 37  | 1  | 1   | 1, 0 | 5  | 217 | 7, 6 | 9  | 421 | 5, 4 | ... | ... | ... | ... | ... | ... |
| ...  | ... | ... | ... | ... | ... | ... | ... | ... | ... | ... | ... | ... | ... | ... | ... |
| 47  | 11 | 11  | 1, 0 | 3  | 227 | 7, 6 | ... | ... | ... | ... | ... | ... | ... | ... | ... |
| 48  | 0  | 12  | 7, 6 | 4  | 216 | 5, 4 | ... | ... | ... | ... | ... | ... | ... | ... | ... |
| 49  | 1  | 13  | 7, 6 | 5  | 217 | 5, 4 | ... | ... | ... | ... | ... | ... | ... | ... | ... |
| ...  | ... | ... | ... | ... | ... | ... | ... | ... | ... | ... | ... | ... | ... | ... | ... |
| 95  | 11 | 23  | 1, 0 | ... | ... | ... | ... | ... | ... | ... | ... | ... | ... | ... | ... |
| 96  | 0  | 24  | 7, 6 | ... | ... | ... | ... | ... | ... | ... | ... | ... | ... | ... | ... |
| 97  | 1  | 25  | 7, 6 | ... | ... | ... | ... | ... | ... | ... | ... | ... | ... | ... | ... |
| ...  | ... | ... | ... | ... | ... | ... | ... | ... | ... | ... | ... | ... | ... | ... | ... |
| 767 | 11 | 191 | 1, 0 | ... | ... | ... | ... | ... | ... | ... | ... | ... | ... | ... | ... |
| 768 | 0  | 192 | 7, 6 | ... | ... | ... | ... | ... | ... | ... | ... | ... | ... | ... | ... |
| 769 | 1  | 193 | 7, 6 | ... | ... | ... | ... | ... | ... | ... | ... | ... | ... | ... | ... |
| ...  | ... | ... | ... | ... | ... | ... | ... | ... | ... | ... | ... | ... | ... | ... | ... |
| 815 | 11 | 203 | 1, 0 | 3  | 419 | 7, 6 | 7  | 623 | 5, 4 | 11 | 827 | 3, 2 | ... | ... | ... |
| 816 | 0  | 204 | 7, 6 | 4  | 408 | 5, 4 | 8  | 612 | 3, 2 | 0  | 816 | 1, 0 | ... | ... | ... |
| 817 | 1  | 205 | 7, 6 | 5  | 409 | 5, 4 | 9  | 613 | 3, 2 | 1  | 817 | 1, 0 | ... | ... | ... |
| ...  | ... | ... | ... | ... | ... | ... | ... | ... | ... | ... | ... | ... | ... | ... | ... |
| 827 | 11 | 215 | 7, 6 | 3  | 419 | 5, 4 | 7  | 623 | 3, 2 | 11 | 827 | 1, 0 | ... | ... | ... |

Figure 8:
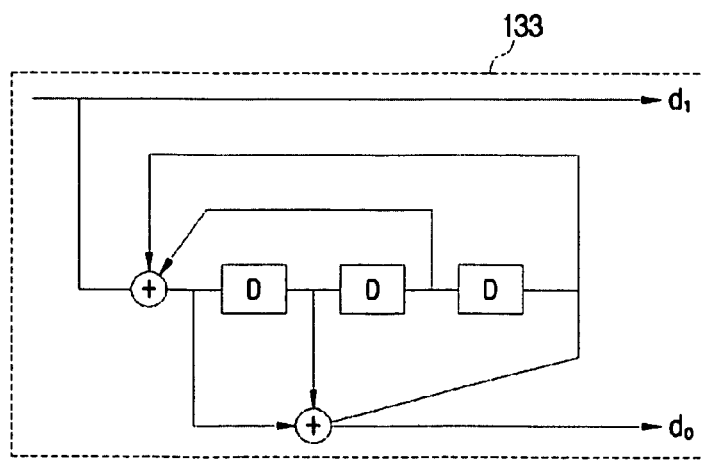
FIG. 8 is a block diagram showing the structure of a turbo encoder of the turbo processing unit of FIG. 7.

An exemplary structure of the turbo encoder 133 of the turbo processing unit 130 of FIG. 7 will now be explained with reference to the block diagram of FIG. 8. According to FIG. 8, the turbo encoder 133 includes a shift register having three elements D and two adders. Accordingly, the turbo encoder 133 convolution-encodes the data to recursive systematic convolutional (RSC) code, to insert parities in the second parity area.

Figure 9G:
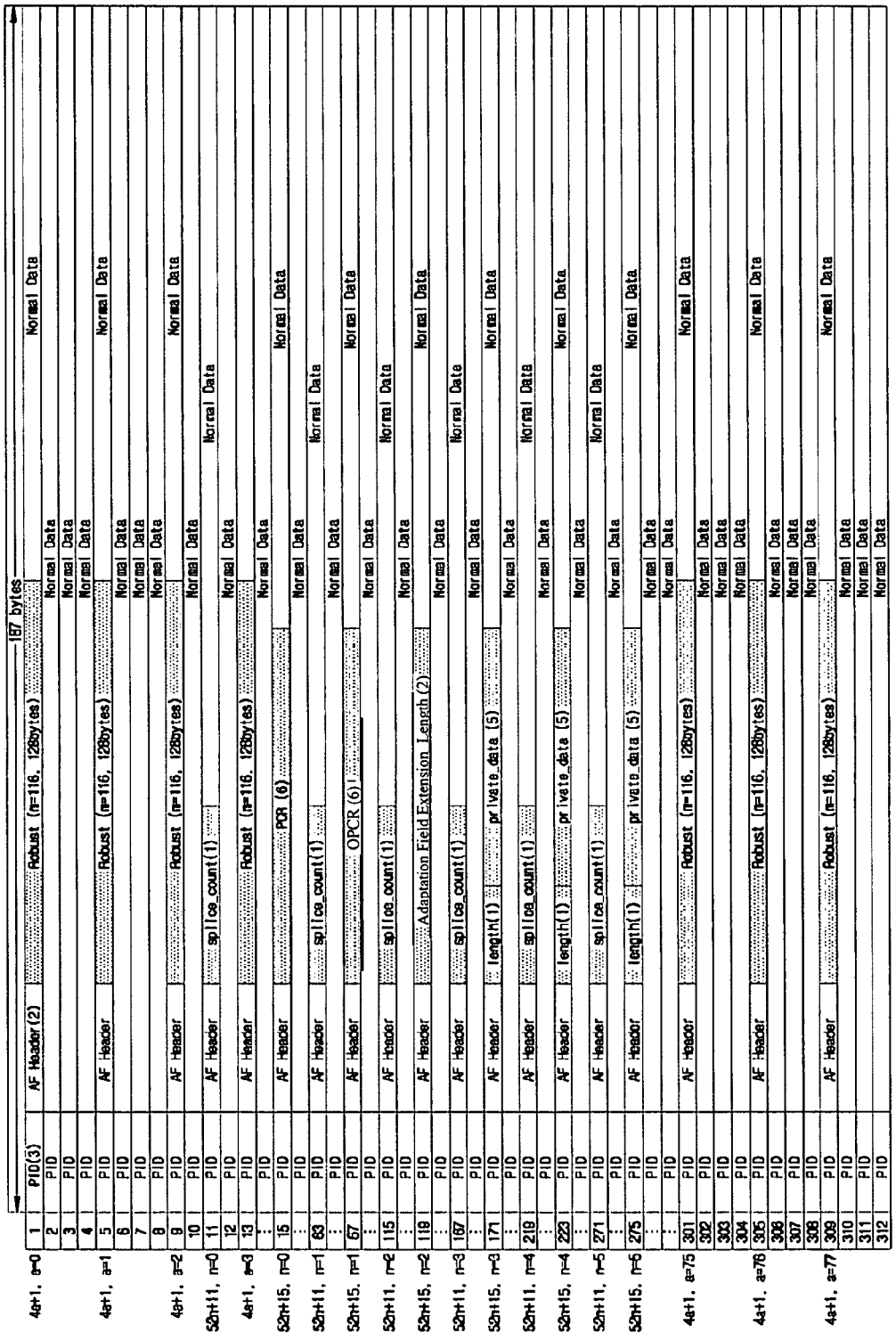

FIGS. 9A through 9G show exemplary structures of the dual TS of the digital broadcasting transmission system of FIG. 4. FIG. 9A shows an example of a turbo stream packet received by the TS structure unit 300. The turbo stream packet may comprise 188 bytes, for example. In this case, more sync that is a header, 2 bytes of an adaptation field (AF) header, N bytes of null data, and 182-N bytes of normal data. The AF header is an area where information about an adaptation field is recorded, so it contains information such as a location, a size, and so on of the adaptation field.

FIG. 9C shows an example of a dual TS (or, a stream packet) generated by the TS generating unit 300. In FIG. 9C, a part of the turbo stream packet of FIG. 9A is inserted in the null data of the normal stream packet of FIG. 9B. In this embodiment, the dual TS comprises 188 bytes, more particularly, 1 byte of sync which is a header, 3 bytes of PID, 2 bytes of an AF header, N bytes of null data, and 182-N bytes of normal data which is a payload. The inserted turbo data shown in FIG. 9C may be a part of the turbo stream packet of FIG. 9A. For example, the inserted turbo data of FIG. 9C may be at least one of the sync, the PID, and the turbo data of FIG. 9A.

FIG. 9D shows a dual TS generated by the TS generating unit 300 according to another embodiment of the invention. According to the embodiment shown in FIG. 9D, the dual TS includes a plurality of consecutive packets. Turbo data is arranged with respect to a predetermined number of packets. That is, FIG. 9D shows that 78-packet turbo streams are inserted in 312-segment packets of one field of the dual TS. The dual TS comprises 1 packet (188 bytes) of the turbo stream and 3 consecutive packets (188 bytes) of the normal streams which are repeatedly arranged at the rate of 1:3.

In case that 70-packet turbo streams are inserted in 312-segment packets of the dual TS, the dual TS is structured in a manner that 4 packets comprising 1 packet (188 bytes) of the turbo streams and 3 consecutive packets (188 bytes) of the normal streams are repeatedly arranged 70 times, and the rest 32 packets comprise the normal stream packets.

FIG. 9E shows a dual TS packet structured by the TS structure unit 300, according to yet another embodiment of the invention. 88 packets of the turbo streams are inserted in 312 segments of the packets of one field of the dual TS. The dual TS is structured in a manner that 4 packets comprising 2 packets (188 bytes) of the turbo streams and 2 packets (188 bytes) of the normal streams are repeatedly arranged 10 times, and 4 packets comprising 1 packet (188 bytes) of the turbo stream and 3 consecutive packets (188 bytes) of the normal streams are repeatedly arranged at the rate of 1:3 as shown in FIG. 9D.

FIG. 9F shows a dual TS structured by the TS structure unit 300, according to still another embodiment of the invention, which is a combined form of the dual TS shown in FIGS. 9C and 9D. The dual TS is structured in a manner that 4 packets are repeatedly arranged, the 4 packets comprising 1 packet (188 bytes) of the turbo stream, 1 packet of the normal stream wherein SRS data and the turbo data are inserted in a part of the AF of the normal stream packet, and 2 packets (188 bytes) of the normal stream packets.

FIG. 9G shows the dual TS which is structured in the form of 312-segment packets. As shown in FIG. 9G, packet information, along with the turbo data and the normal data, is included in the dual TS. The packet information may be recorded in the option field. In this case, locations of option field can be designated and fixed so as not to overlap with the turbo data. In FIG. 9G, "m" denotes a possible length (byte) of the turbo data.

According to FIG. 9G, the option fields recording the number of macro blocks (splice countdown) are arranged in the segments 11, 63, 115, 167, 219, 271, while the option fields recoding program clock reference (PCR) are arranged in the segments 15, 67, 119.

When dividing the 312 segments into 52-segment units, the locations of the option fields can be expressed as follows:

Program clock reference (PCR) (using 6 bytes): 52n+15, n=0;

Original program clock reference (OPCR) (using 6 bytes): 52n+15, n=1;

Adaptation field extension length (using 2 bytes): 52n+15, n=2;

Transport private data length (using 5 bytes): 52n+15, n=3, 4, 5; and a number of macro blocks (splice countdown) (using 1 byte): 52n+15, n=0, 1, 2, 3, 4, 5

The "transport private data length" among these, for example, exists in the segments 171, 223, 275. The dual TS in which the turbo data is inserted in the null data except the option fields can be structured in various ways besides the above-introduced ways. Additionally, the structural rate of the turbo data can be adjusted according to the structure of the dual TS packet.

Figure 10:
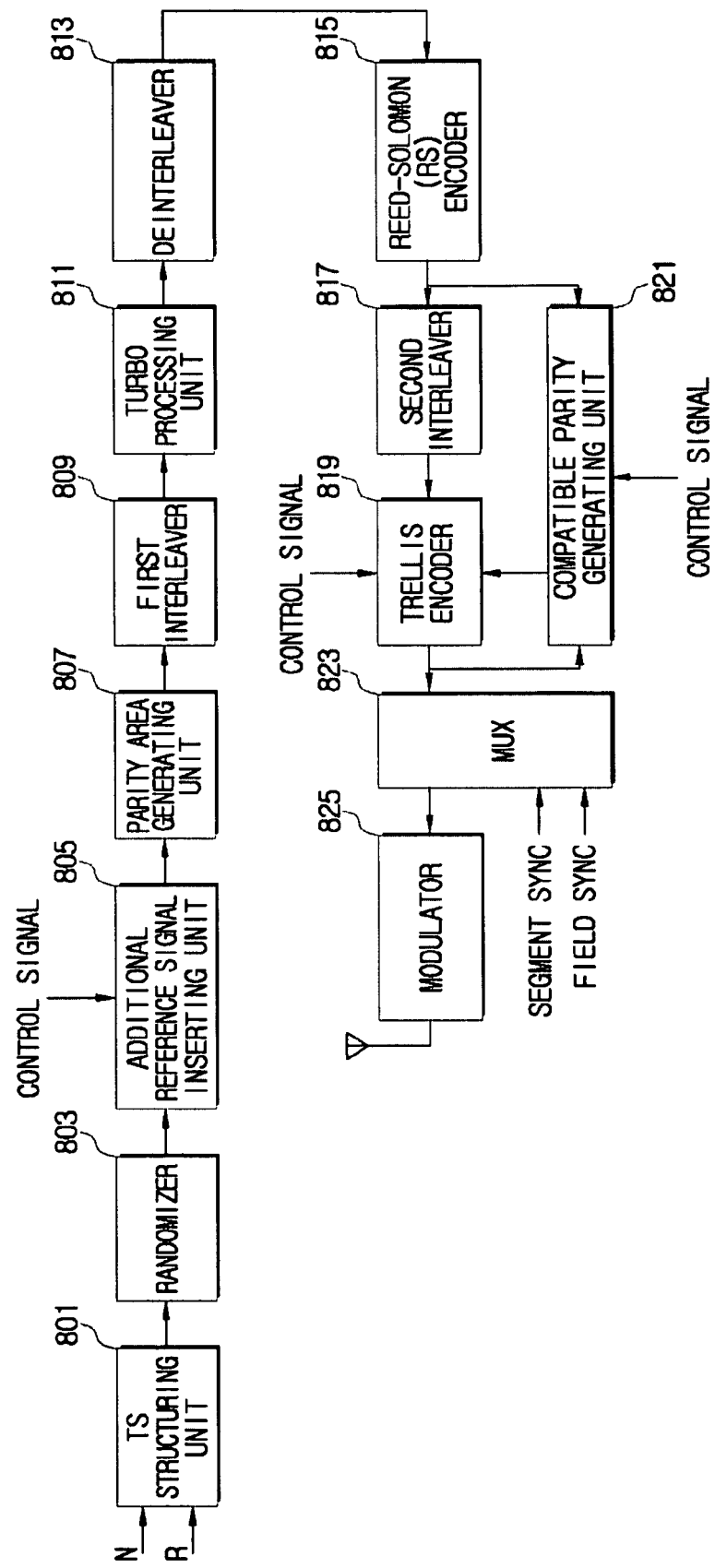
FIG. 10 is a block diagram showing a digital broadcasting transmission system that transmits a supplementary reference sequence (SRS) according to an embodiment of the invention.

FIG. 10 is a block diagram showing a digital broadcasting transmission system that transmits a supplementary reference sequence (SRS). While described in the context of SRS, it is understood that other training sequences and/or sets of known data can be implemented in other aspects of the invention. Referring to FIG. 10, the digital broadcasting transmission system includes a TS structure unit 801 including a stuffing region to insert SRS data in respective packets of the dual TS, a randomizer 803 randomizing the dual TS packet (hereinafter, referred to as merely "packet"), a supplementary reference sequence inserting unit 805 inserting the SRS data in the stuffing region of the randomized packet, a parity area generating unit 807 generating a first area for inserting a parity for error correction, a first interleaver 809 primarily interleaving the packet where the first area is generated, a turbo processing unit 811 convolution-encoding and interleaving the turbo stream included in the primarily interleaved packet, a deinterleaver 813 deinterleaving the packet processed by the turbo processing unit 811, a Reed-Solomon (RS) encoder 815 inserting the parity in the first area of the deinterleaved packet, a second interleaver 817 secondarily interleaving the packet where the parity is inserted, a trellis encoder 819 trellis encoding the interleaved packet, a MUX 823 multiplexing the trellis-encoded packet by adding a sync, and a modulator 825 channel-modulating and transmitting the multiplexed packet. Additionally, a backwards compatibility parity generator 821 generating a compatible parity may be further included.

Known SRS data for synchronization and/or channel equalization may be inserted in the dual TS packet received by the digital broadcasting transmission, which will be described in detail with reference to FIG. 9. The TS structure unit 801 receives the normal stream and the turbo stream and structures the dual TS packet. According to an embodiment of the invention, the dual TS packet may include a stuffing region for inserting therein the known SRS data for synchronization and/or channel equalization. The TS structure unit 801 may be constructed in the same way as explained above with reference to FIG. 5, and therefore, description thereof will be omitted for the sake of brevity. If the TS structure unit 801 includes the first Reed-Solomon encoder 310 as in the above embodiment shown in FIG. 5, the Reed-Solomon encoder 815 of FIG. 10 will be called as a second Reed-Solomon encoder for the convenience in explanation.

The stuffing region for inserting therein the known SRS data for synchronization and/or channel equalization will now be described. The stuffing region may be a part of the packet including a header and a payload. More particularly, the packet further includes an adaptation field (AF). The stuffing region as part of the AF is positioned not to be overlapped with the option field included in the AF. The option field comprises a program clock reference (PCR) used for synchronization of a demodulator of a receiver, an original PCR (OPCR) used for recording, reservation, and reproduction of a program in the receiver, four circuit blocks, the number of macro blocks (splice countdown) denoting the number of consecutive macro blocks comprising one Cr block and one Cb block, transport private data length denoting length of text data for teletext broadcasting, and AF extension length.

According to an embodiment of the invention, the AF of the packet may further include a stuffing region for inserting therein data for initializing the trellis encoder 809 that will be described hereinafter. The randomizer 803 randomizes the packet including the stuffing region.

The SRS inserting unit 805 inserts the SRS data in the stuffing region of the randomized packet. Here, the SRS data is a reference signal, that is, specific sequence data having a pattern predetermined by the transmitter and the receiver. Since the SRS data is different from general payload data transceiving the pattern of the reference signal, the SRS data can be detected easily from general packets to be transmitted and thereby used for synchronization of the receiver and/or channel equalization. The insertion of the SRS data in the stuffing region can be controlled by a predetermined controlling signal.

The parity area generating unit 807 generates a first area for inserting the parity for error correction in the packet where the SRS data is inserted. As shown, the first area is for inserting therein the parity added by the RS encoder 815. The first interleaver 809 primarily interleaves the packet where the parity area is generated. The turbo processing unit 811 convolution-encodes the turbo stream included in the primarily interleaved packet and interleaves the convolution-encoded turbo stream. The turbo processing unit 811 is configured as shown in FIG. 7 and operates in the same manner as described with reference to FIG. 7.

The deinterleaver 813 deinterleaves the packet output from the turbo processing unit 811. The RS encoder 815 adds the parity to the deinterleaved dual TS. According to an embodiment of the invention, the RS encoder 815, being structured in the form of concatenated code, inserts the parity to correct errors generated by the channel at the first area of the packet where the SRS data is inserted. The second interleaver 817 secondarily interleaves the packet where the parity is inserted. The trellis encoder 819 trellis encodes the secondarily interleaved packet.

According to an embodiment of the invention, the trellis encoder 819 can be initialized to a predetermined value right before the SRS data included in the interleaved packet is trellis-encoded. The initialization is required due to the SRS data. More specifically, the trellis encoder 819 may generate different encoded results for the same data depending on the previously encoded data. Therefore, the result of trellis encoding of the SRS data may vary according to data previous to the SRS data and in this case, the receiver cannot discriminate the SRS data. To solve such a problem, the trellis encoder 819 is initialized to the predetermined value right before trellis encoding of the SRS data. In other words, the predetermined value is trellis encoded right before the SRS data is trellis-encoded.

The trellis encoder 819 according to an embodiment of the invention may include i) a general mode that trellis encodes the packet interleaved by the interleaver, ii) an initialization mode that initializes the trellis encoder 819, and iii) a parity replacement mode that trellis-encodes the compatible parity substituted for the whole or a part of the parity applied by the RS encoder 815. For this purpose, the trellis encoder 819 may receive a control signal from a control signal generation unit (not shown), the control signal operated in the general mode, the initialization mode, or the parity replacement mode.

When the trellis encoder 819 receives a control signal commanding the initialization mode while operating in the general mode, the trellis encoder 819 is operated in the initialization mode. If it receives a control signal commanding the parity replacement mode while it is operating in the general mode, the trellis encoder 819 is operated in the parity replacement mode. The control signal may be supplied from the control signal generation unit (not shown) which is aware of location of the inserted SRS data, location of the inserted value for initializing the trellis encoder 819, and location for replacing the compatible parity.

The backwards compatibility parity generating unit 821 receives the packet where the parity is added by the RS encoder 815 and the packet encoded by the trellis encoder 819, and generates the compatible parity based on the received packets. More specifically, the backwards compatibility parity generating unit 821 includes a symbol decoder (not shown) receiving the packet encoded by the trellis encoder 819 and converting a symbol-mapped packet to a byte form, a deinterleaver (not shown) deinterleaving the decoded packet, and a memory (not shown) replacing at least a part of the received packet with the deinterleaved packet and storing the deinterleaved packet. Preferably, the memory (not shown) may replace and store only the different part between the received packet and the deinterleaved packet. For this, the backwards compatibility parity generating unit 821 may receive a predetermined control signal from the control signal generation unit (not shown), for example. The memory (not shown) may include an RS encoder (not shown) adding the compatible parity to the packet stored in the memory, an interleaver (not shown) interleaving the packet where the compatible parity is added, and a symbol encoder (not shown) symbol-mapping the packet in the byte form in order to transmit the interleaved packet to the trellis encoder 819.

The MUX 823 multiplexes the trellis-encoded packet by adding the segment sync and the field sync to the trellis-encoded packet. The modulator 825 performs channel-modulation with respect to the packet where the segment sync and the field sync are added, up-converts the modulated packet to a signal of an RF channel band, and transmits the converted signals.

Figure 11G:
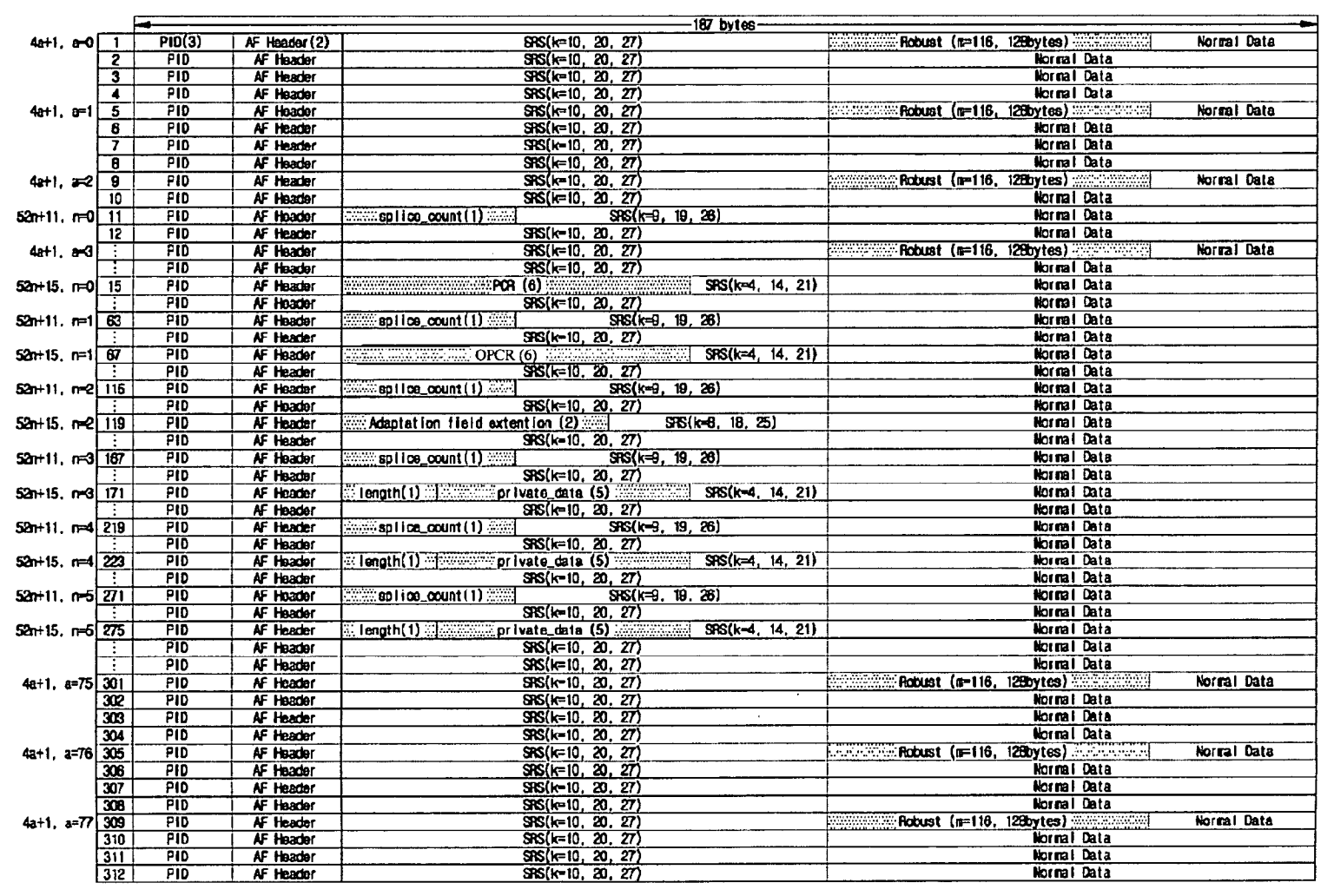

FIGS. 11A through 11G show the structure of a TS packet including the SRS, according to an embodiment of the invention. FIG. 11A shows a turbo stream packet received by the TS structure unit 801. The turbo stream packet (188 bytes) comprises 1 byte of sync which is a header, 3 bytes of PID, and 184 bytes of turbo data. FIG. 11B shows a normal stream packet including a stuffing region for inserting the known SRS signal for synchronization in the TS structure unit. The normal stream packet (188 bytes) comprises 1 byte of sync which is a header, 3 bytes of PID, 2 bytes of AF header, S-bytes of stuffing region, N-bytes of null data, and 182-N-S bytes of normal data which is a payload. FIG. 11C shows a dual TS packet including the stuffing region for inserting the known SRS signal for synchronization in the TS structure unit, according to an embodiment of the invention. More specifically, in FIG. 11C, part of the turbo stream packet of FIG. 11A is inserted in the null data of the normal stream packet of FIG. 11B, and the SRS data is inserted in the stuffing region. In this embodiment, the dual TS comprises 188 bytes, more particularly, 1 byte of sync which is a header, 3 bytes of PID, 2 bytes of AF header, S-bytes of SRS data, N-bytes of null data, and a 182-N-S bytes of normal data which is a payload.

FIG. 11D shows a dual TS packet including the stuffing region for inserting the known SRS signal for synchronization in the TS structure unit, according to another embodiment of the invention. Differently from the dual TS packet of FIG. 9C, 78-packet turbo streams are inserted in 312-segment packets of one field of the dual TS. The dual TS is structured in a manner that 4 packets comprising 1 packet (188 bytes) of the turbo stream and 3 consecutive packets (188 bytes) of the normal streams are repeatedly arranged at the rate of 1:3. When 70 packets of the turbo streams are inserted in 312 segments of the packets of the dual TS, on the other hand, the dual TS is structured in a manner that 4 packets comprising 1 packet (188 bytes) of the turbo streams and 3 consecutive packets (188 bytes) of the normal streams are repeatedly arranged 70 times, and the rest 32 packets comprise the normal stream packets.

FIG. 11E shows a dual TS packet including the stuffing region for inserting the known SRS signal for synchronization in the TS structure unit, according to yet another embodiment of the invention. Differently from the dual TS packet of FIG. 9C, 88-packet turbo streams are inserted in 312-segment packets of one field of the dual TS. The dual TS is structured in a manner that 4 packets comprising 2 packets (188 bytes) of the turbo streams and 2 packets (188 bytes) of the normal streams are repeatedly arranged 10 times, and 4 packets comprising 1 packet (188 bytes) of the turbo stream and 3 consecutive packets (188 bytes) of the normal streams are repeatedly arranged at the rate of 1:3 as shown in FIG. 9D.

FIG. 11F shows a dual TS packet including the stuffing region for inserting the known SRS signal for synchronization in the TS structure unit, according to still another embodiment of the invention, which is a combined form of the dual TS packets shown in FIGS. 11C and 11D. The dual TS packet is structured in a manner that 4 packets are repeatedly arranged, the 4 packets comprising 1 packet (188 bytes) of the turbo stream, 1 packet of the normal stream wherein the SRS data and the turbo data are inserted in a part of the AF of the normal stream packet, and 2 packets (188 bytes) of the normal stream packets.

FIG. 11G shows the dual TS packet including the stuffing region for inserting the known SRS signal for synchronization in the TS structure unit, in the form of segment packets as shown in FIG. 11C. Among 312-segment packets of one field of dual TS, the turbo data is inserted in a non-option field part of the packet including data of the option field. In FIG. 11G, 'k' denotes a possible length (byte) of the SRS data. In addition, the turbo data is inserted next to the SRS data. Here, 'm' denotes a possible length (byte) of the turbo data.

When dividing the 312 segments by 52-segment unit, location of the option field can be expressed as follows:

Program clock reference (PCR) (using 6 bytes): 52n+15, n=0;

Original program clock reference (OPCR) (using 6 bytes): 52n+15, n=1;

Adaptation field extension length (using 2 bytes): 52n+15, n=2;

Transport private data length (using 5 bytes): 52n+15, n=3, 4, 5; and

The number of macro blocks (splice countdown) (using 1 byte): 52n+15, n=0, 1, 2, 3, 4, 5.

The "transport private data length" among these, for example, exists on the location where n=3, 4, or 5.

The dual TS in which the turbo data is inserted in the null data except the option field can be structured in various ways besides the above-introduced ways. Additionally, the structural rate of the turbo data can be adjusted according to the structure of the dual TS packet.

Figure 12:
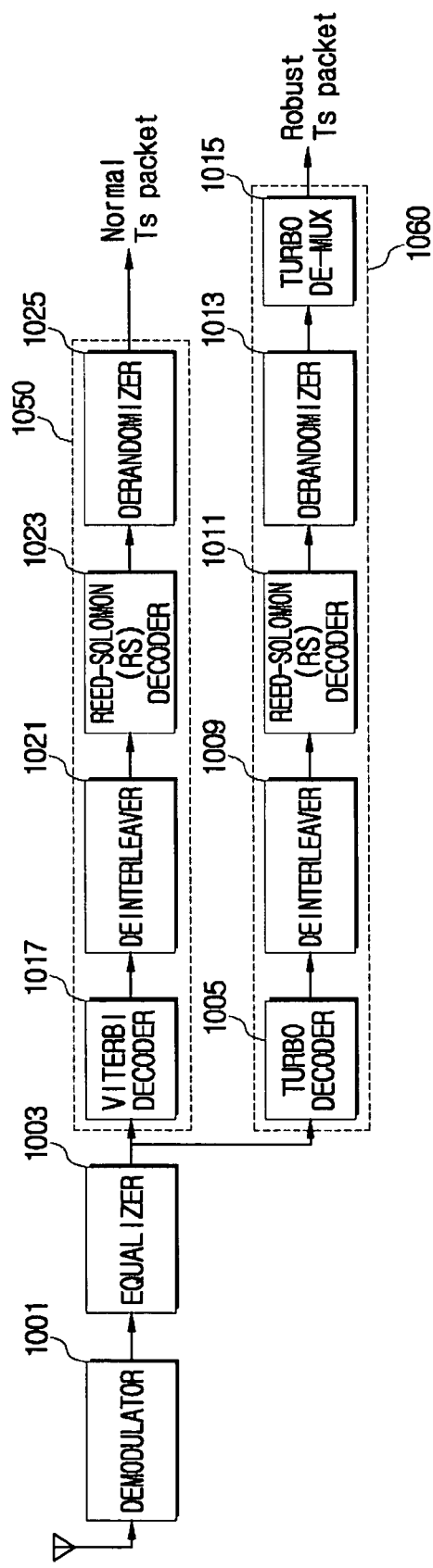
FIG. 12 is a block diagram showing the structure of a digital broadcasting reception system according to an embodiment of the invention.

FIG. 12 is a block diagram showing a digital broadcasting reception system according to an embodiment of the invention. Referring to FIG. 12, the digital broadcasting reception system comprises a modulator 1001, an equalizer 1003, a first processor 1050, and a second processor 1060. The digital broadcasting reception system receives the dual TS, demodulates the received dual TS, equalizes the demodulated dual TS, Viterbi-decodes and deinterleaves the normal stream of the equalized dual TS, RS-decodes the deinterleaved normal stream, and derandomizes the RS-decoded normal stream. The digital broadcasting reception system turbo-decodes and deinterleaves the turbo stream of the equalized dual TS, RS-decodes the deinterleaved turbo stream, and derandomizes the RS-decoded turbo stream. The modulator 1001 performs synchronization detection and demodulation with respect to the baseband signal of the received dual TS. The equalizer 1003 compensates for channel distortion generated by multipaths of the channel from the demodulated dual TS, thereby removing interference between the received symbols.

The first processor 1050 includes a Viterbi decoder 1017, a deinterleaver 1021, an RS decoder 1023, and a derandomizer 1025. The Viterbi decoder 1017 performs error correction with respect to the normal stream of the equalized dual TS and decodes the error-corrected symbols, thereby outputting the symbol packet. The distributed decoded packet can be rearranged by the deinterleaver 1021. The RS decoder 1023 performs error correction with respect to the deinterleaved packet. The derandomizer 1025 derandomizes the packet error-corrected by the RS decoder 1023. Accordingly, the normal stream of the dual TS is restored.

The second processor 1060 includes a turbo decoder 1005, a second deinterleaver 1009, an RS decoder 1011, a derandomizer 1013, and a turbo DE-MUX 1015. However, it is understood that the second processor 1060 need not include all shown elements, such as the turbo DE-MUX 1015, in all aspects of the invention. The turbo decoder 1005 turbo-decodes the turbo stream of the equalized dual TS. The turbo decoding is performed by trellis-decoding the turbo stream of the equalized dual TS, deinterleaving and convolution-decoding the trellis-decoded turbo stream, frame-formatting the convolution-decoded turbo stream, and thereby converting the turbo stream in the symbol form to the byte form.

Meanwhile, the turbo decoder 1005 is capable of trellis-decoding the normal stream of the equalized dual TS. The trellis-decoded normal stream is converted from the symbol form to the byte form using a symbol-byte converter (not shown). The converted normal stream is deinterleaved to remove the parity. The parity-removed normal stream is derandomized, thereby being restored.

The deinterleaver 1009 deinterleaves the turbo-decoded turbo stream. The RS decoder 1011 removes the parity added to the deinterleaved turbo stream. The derandomizer 1013 derandomizes the parity-removed turbo stream. The turbo DE-MUX 1015 demultiplexes the derandomized turbo stream. The turbo stream herein is capable of receiving the turbo data among the turbo stream demultiplexed and formatted to the frame form.

Figure 13:
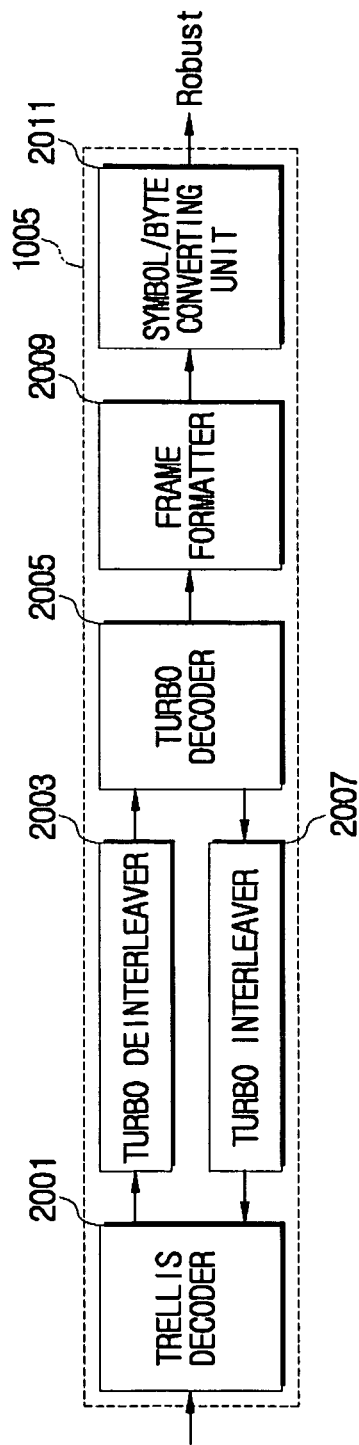
FIG. 13 is a block diagram of a turbo decode of the digital broadcasting reception system of FIG. 12.

FIG. 13 is a block diagram of the turbo decoder of the digital broadcasting reception system of FIG. 12. Referring to FIGS. 12 and 13, the turbo decoder 1005 comprises a trellis decoder 2001, a turbo deinterleaver 2003, a turbo decoder 2005, a turbo interleaver 2007, a frame formatter 2009, and a symbol/bye converting unit 2011.

The trellis decoder 2007 trellis-decodes the equalized dual TS. According to this embodiment, the trellis decoder 2007 may trellis-decode the turbo stream of the dual TS and also a soft decision turbo stream which is turbo-interleaved. The turbo deinterleaver 2003 deinterleaves the trellis-decoded turbo stream. The turbo decoder 2005 convolution-decodes the deinterleaved turbo stream, thereby outputting a soft decision or a hard decision. "Soft decision" refers to a value including information on a metric of the turbo stream. For example, when the metric of the turbo stream is "1" and when the metric of the turbo stream results in "0.8", the soft decision value "0.8" is output. When the metric of the turbo stream results in "1", the hard decision, that is, the turbo stream, is output.

The turbo interleaver 2007 interleaves the hard decision turbo stream that is convolution-decoded. The frame formatter 2009 formats the convolution-decoded hard decision turbo stream corresponding to the frame of the dual TS.

The operation of the symbol/byte converter 2011 to convert the frame-formatted turbo stream from the symbol form to the byte form can be easily understood by referring to Table D5.2 of the 'ATSC DTV standard (A/53)' as set forth above.

Figure 14:
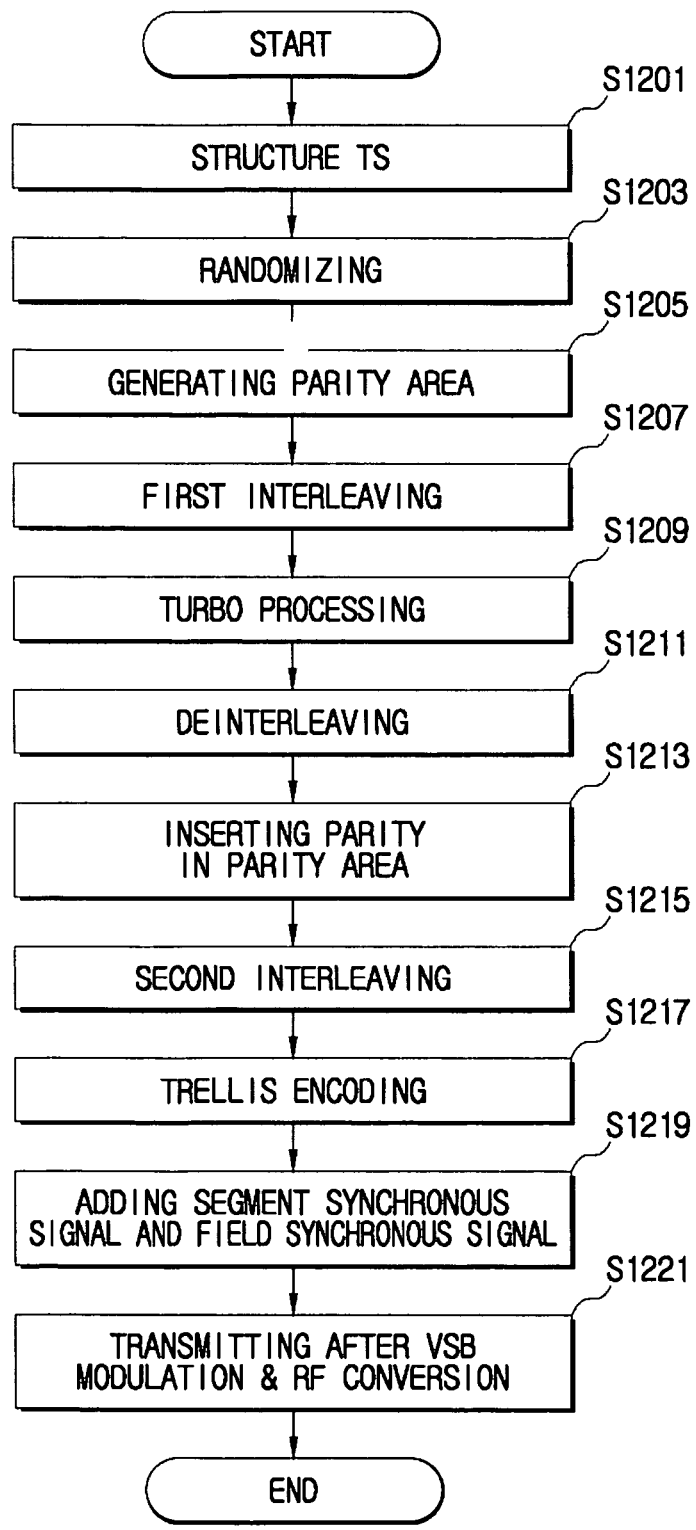
FIG. 14 is a flowchart for explaining an example of a signal processing method in the digital broadcasting transmission system of FIG. 6.

FIG. 14 is a flowchart for explaining an example of a signal processing method in the digital broadcasting transmission system of FIG. 6. Referring to FIG. 14 and FIG. 6, the TS structure unit 300 receives the normal stream and the turbo stream, generates the second area for inserting the parity in the received turbo stream, and multiplexes the received normal stream and the turbo stream where the second area is generated, thereby structuring the dual TS (S1201). The randomizer 150 randomizes the dual TS output from the TS structure unit 300 (S1203). The parity area generator 110 generates the first area for inserting the parity for error correction in the randomized dual TS (S1205). The first interleaver 120 primarily interleaves the dual TS where the parity area is generated (S1207), and the turbo processing unit 130 convolution-encodes the turbo stream included in the primarily interleaved dual TS and interleaves the convolution-encoded turbo stream (S1209). The deinterleaver 140 deinterleaves the dual TS output from the turbo processing unit 130 (S1211). The RS encoder 210 inserts the parity in the first area of the deinterleaved dual TS (S1213).

The second interleaver 220 secondarily interleaves the dual TS where the parity is inserted (S1215). The trellis-encoder 230 trellis-encodes the secondarily interleaved dual TS (S1217). The MUX 240 multiplexes the trellis-encoded dual TS by adding the segment sync and the field sync (S1219). The modulator 250 channel-modulates the multiplexed dual TS, up-converts the dual TS to a signal of a radio frequency (RF) channel band, and transmits the up-converted signal (S1221).

Figure 15:
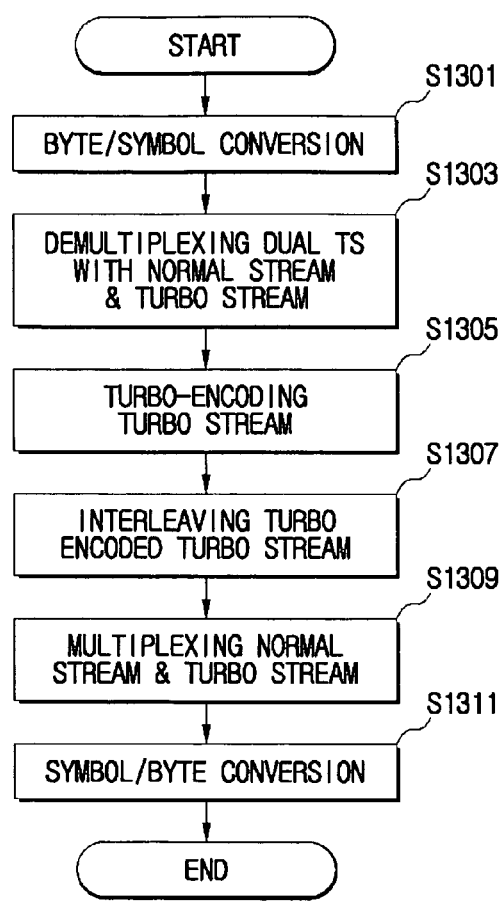
FIG. 15 is a flowchart for explaining an example of a signal processing method in the turbo processing unit of FIG. 7.

FIG. 15 is a flowchart for explaining an example of a signal processing method in the turbo processing unit of FIG. 7. Referring to FIG. 15 and FIG. 7, the byte-symbol converter 131 converts the primarily interleaved dual TS from the byte form to the symbol form (S1301). The TS DE-MUX 132 demultiplexes the dual TS converted to the symbol form into the normal stream and the turbo stream (S1303). The turbo encoder 133 convolution-encodes the turbo stream of the demultiplexed dual TS (S1305).

Through the convolution-encoding, the parity with respect to the turbo stream is additionally generated and inserted in the second area of the turbo stream. The turbo interleaver 134 interleaves the convolution-encoded turbo stream (S1307). The turbo data MUX 135 multiplexes the interleaved turbo stream and the demultiplexed normal stream, thereby structuring the dual TS (S1309). The symbol-byte converter 136 converts the dual TS from the symbol form to the byte form (S1311).

Figure 16:
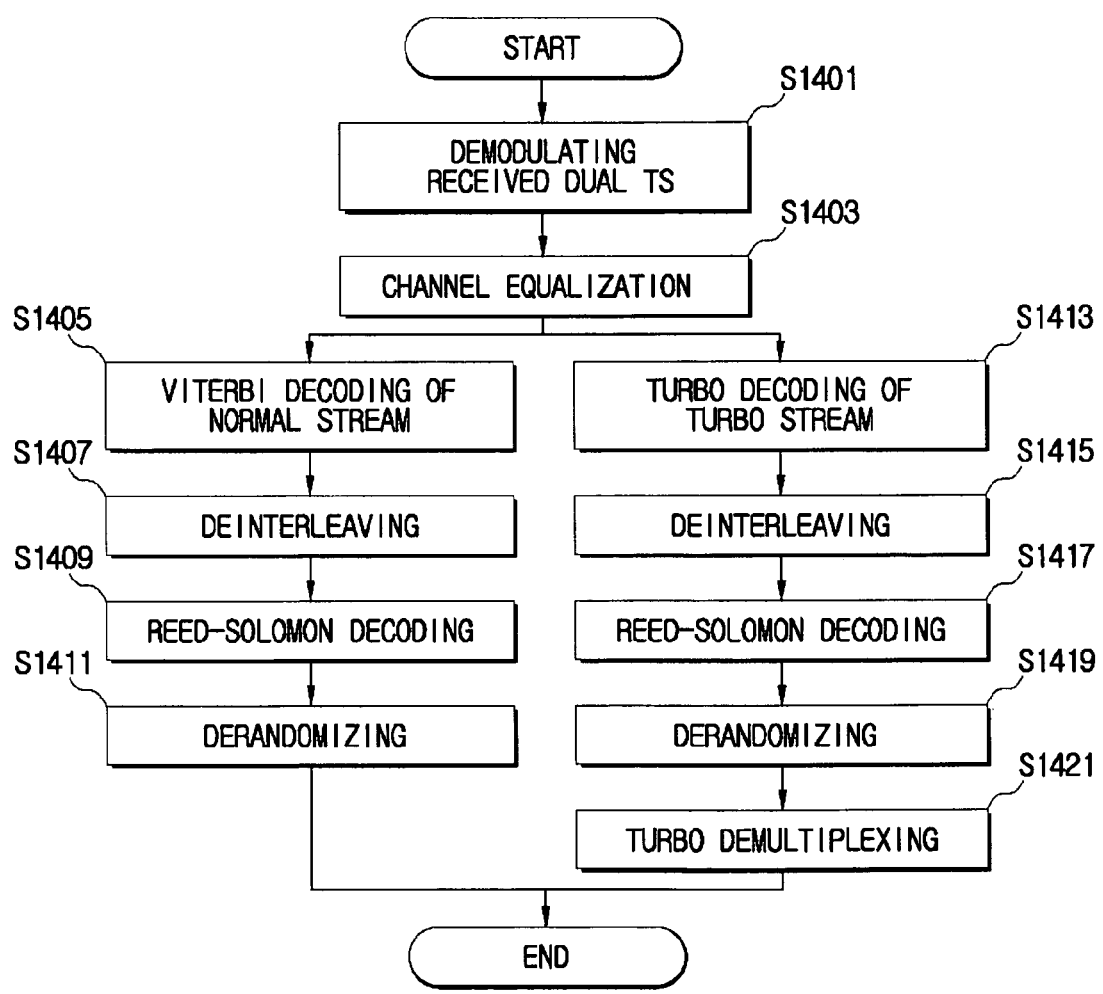
FIG. 16 is a flowchart for explaining an example of a signal processing method in the digital broadcasting reception system of FIG. 12.

FIG. 16 is a flowchart for explaining an example of a signal processing method in the digital broadcasting reception system of FIG. 12. Referring to FIG. 16 and FIG. 12, the demodulator 1001 detects and demodulates synchronization according to the sync added to the signal of the baseband of the received dual TS (S1401). The equalizer 1003 compensates channel distortion generated by multipaths of the channel from the demodulated dual TS, thereby removing interference between the received symbols (S1403).

The Viterbi decoder 1005 of the first processor 1050 performs error correction with respect to the normal stream of the equalized dual TS, decodes the error-corrected symbol, and outputs the symbol packet (S1405). The distributed decoded packet is rearranged by the deinterleaver 1009 (S1407). The RS decoder 1023 performs error correction with respect to the deinterleaved packet (S1409). The derandomizer 1025 derandomizes the packet error-corrected by the RS decoder 1023 (S1411). Accordingly, the normal stream of the dual TS is restored.

The turbo decoder 1005 of the second processor 1060 turbo-decodes the turbo stream of the equalized dual TS (S1413). The turbo decoding is performed by trellis-decoding the turbo stream of the equalized dual TS, deinterleaving and convolution-decoding the trellis-decoded turbo stream, frame-formatting the convolution-decoded turbo stream, and thereby converting the turbo stream from the symbol form to the byte form. The deinterleaver 1009 deinterleaves the turbo-decoded turbo stream (S1415). The RS decoder 1011 removes the parity added to the deinterleaved turbo stream (S1417). The derandomizer 1013 derandomizes the parity-removed turbo stream (S1419). The turbo DE-MUX 1015 demultiplexes the derandomized turbo stream (S1421). The turbo stream herein is capable of receiving the turbo data among the turbo stream demultiplexed and formatted to the frame form.

Figure 17:
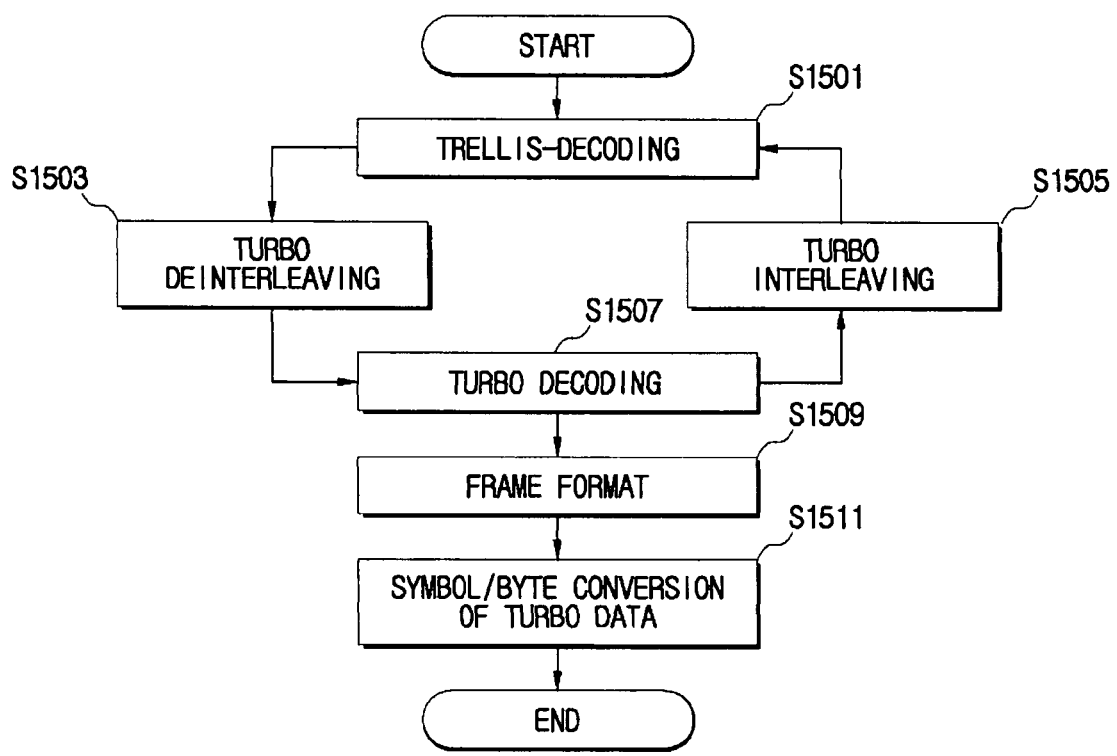
FIG. 17 is a flowchart for explaining an example of a signal processing method in the turbo decoder of FIG. 13.

FIG. 17 is a flowchart for explaining an example of a signal processing method in the turbo decoder of FIG. 13. Referring to FIG. 17 and FIG. 13, the trellis-decoder 2007 of the turbo decoder 1005 trellis-decodes the equalized dual TS (S1501), the turbo deinterleaver 2003 deinterleaves the trellis-decoded turbo stream (S1503), and the turbo decoder 2005 convolution-decodes the deinterleaved turbo stream (S1507), thereby outputting soft decision or hard decision. Here, the soft decision refers to a value including information on a metric of the turbo stream. For example, when the metric of the turbo stream is "1" and when the metric of the turbo stream results in "0.8", the soft decision value "0.8" is output. When the metric of the turbo stream results in "1", the hard decision, that is, the turbo stream is output. The output soft decision is interleaved through the turbo interleaver 2007 (S1505) and trellis-decoded for error correction. Therefore, the above processes are repeated until the metric of the turbo stream becomes "1" to output the hard decision. Details of turbo coding per se are not provided because they are well known in the art. Moreover, the invention is not limited to turbo coding, and aspects of the invention may use other types of coding in place of or in addition to turbo coding.

The frame formatter 2009 formats the convolution-decoded hard decision turbo stream corresponding to the frame of the dual TS (S1509). The symbol-byte converter 2011 may convert the frame-formatted turbo stream from the symbol form to the byte form (S1511).

As can be appreciated from the above description of the method for turbo-processing and transmitting the TS for digital broadcasting, the digital broadcasting transmission/reception system, and the signal processing method thereof, according to certain embodiments of the invention, reception performance of a terrestrial-wave digital television (DTV) in the US in accordance with the advanced television system committee (ATSC) vestigial sideband (VSB) can be enhanced through information exchange and mapping with respect to a dual transport stream (TS) which includes normal data and turbo data. As a result, the digital broadcasting transmission system provides not only the compatibility with existing normal data transmission systems, but also the improved receptivity under a variety of reception environments.

While not required, it is understood that aspects of the invention can be implemented using software, hardware, and combinations thereof. While described in terms of a broadcast signal sent through air or cable, it is understood that, the transmission can be made through recording on a medium for delayed playback in other aspects of the invention.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of processing a digital broadcasting signal, comprising:
    preparing a first area for parity insertion with respect to a dual transport stream (TS) which includes a normal stream multiplexed with a turbo stream;
    interleaving the dual TS which includes the first area;
    detecting the turbo stream from the interleaved dual TS, exclusively encoding the detected turbo stream, and stuffing the encoded turbo stream in the dual TS for turbo processing;
    deinterleaving the turbo-processed dual TS;
    transmitting, by a digital broadcast transmitter, the deinterleaved turbo-processed dual TS;
    receiving, by a digital broadcast receiver, the transmitted dual TS;
    demodulating the received dual TS;
    equalizing the demodulated dual TS;
    decoding the normal stream of the equalized dual TS to recover a normal data packet; and
    decoding the turbo stream of the equalized dual TS to recover a turbo data packet.

2. The method of claim 1, further comprising, before preparing the first area, preparing a second area for parity insertion with respect to the turbo stream; and generating the dual TS by multiplexing the turbo stream having the second area for parity insertion therein with the normal stream.

3. The method of claim 1, wherein the detecting the turbo stream comprises:
    detecting the turbo stream by demultiplexing the dual TS which is interleaved;
    encoding the detected turbo stream by inserting a parity with respect to the detected turbo stream into a second area created for parity insertion;
    interleaving the encoded turbo stream; and
    generating the dual TS by multiplexing the interleaved turbo stream, and the normal stream.

4. The method of claim 3, wherein the detecting the turbo stream further comprises:
    converting a basic unit of the interleaved dual TS from a byte to a symbol; and
    converting a basic unit of the generated dual TS from a symbol to a byte.

5. The method of claim 1, wherein the transmitting of the deinterleaved dual TS comprises:
    encoding by inserting a parity with respect to the deinterleaved dual TS into the first area for parity insertion;
    interleaving the encoded dual TS;
    trellis-encoding the interleaved dual TS;
    multiplexing by adding a synchronization signal to the trellis-encoded dual TS; and
    channel-modulating the multiplexed dual TS and transmitting a resulting stream.

6. The method of claim 1, wherein:
    the dual TS comprises a field containing a plurality of consecutive packets;
    an option field recording a predetermined type of packet information therein, is arranged in the packet which is located in a predetermined position on the field without overlapping with the turbo stream; and
    the option field comprises a program clock reference (PCR), an original program clock reference (OPCR), a splice countdown which indicates a number of macro blocks, a transport private data length, and/or an adaptation field extension length.

7. The method of claim 1, wherein:
    the dual TS comprises a field containing a plurality of consecutive packets; and
    the turbo stream and the normal stream are arranged in the plurality of packets, respectively.

8. The method of claim 1, wherein the decoding the normal stream comprises:
    decoding in which an error is corrected with respect to the normal stream of the equalized dual TS and the error-corrected normal stream is decoded;
    deinterleaving the normal stream which is decoded by the viterbi decoder;
    correcting an error of the deinterleaved normal stream; and
    recovering the normal data packet by derandomizing the error-corrected normal stream.

9. The method of claim 1, wherein the decoding the turbo stream comprises:
    turbo decoding the turbo stream of the equalized dual TS;
    deinterleaving the turbo-decoded turbo stream;
    Reed-Solomon decoding the deinterleaved turbo stream; and
    derandomizing the Reed-Solomon decoded turbo stream.

10. The method of claim 1, further comprising:
    inserting a supplementary reference sequence in a stuffing area of the dual TS which includes a normal stream multiplexed with a turbo stream; and
    equalizing the demodulated dual TS using the supplementary reference sequence retrieved from the stuffing area as compared to a supplementary reference sequence stored at a receiver.

11. The method of claim 10, further comprising multiplexing the normal stream and the turbo stream to generate the dual TS, and preparing the stuffing area in the dual TS.

12. The method of claim 11, further comprising, before the inserting the supplementary reference sequence, randomizing the dual TS which has the stuffing area therein.

13. The method of claim 11, wherein multiplexing the normal stream and the turbo stream comprises preparing a second area for parity insertion with respect to the turbo stream.

14. The method of claim 10, wherein:
    the dual TS is in a form of a frame comprising a plurality of consecutive packets, each packet comprising an adaptation field; and
    the stuffing area is at least a part of the adaptation field.

15. The method of claim 14, wherein the dual TS comprises the turbo stream arranged in the packets of the frame at predetermined packet intervals.

16. The method of claim 14, wherein:
    the dual TS comprises an option field arranged in the packet located in a predetermined position of the field which does not overlap with the turbo stream;
    the stuffing area is at least a part of the adaptation field excluding the option field; and
    the option field comprises a program clock reference (PCR), an original program clock reference (OPCR), a splice countdown which indicates a number of macro blocks, a transport private data length, and/or an adaptation field extension length.

17. A digital broadcasting system comprising:
a transmission source comprising:
- a parity area generating unit preparing a first area for parity insertion with respect to a dual transport stream (TS) which includes a normal stream multiplexed with a turbo stream;
- a first interleaver interleaving the dual TS which is transmitted from the parity area generating unit;
- a turbo processing unit detecting the turbo stream from the interleaved dual TS, exclusively encoding the detected turbo stream for turbo-processing, and stuffing the encoded turbo stream into the dual TS;
- a deinterleaver deinterleaving the dual TS which is processed by the turbo processing unit; and
- a transmitting unit transmitting the dual TS which is processed at the deinterleaver; and a digital broadcasting receiver system comprising:
- a demodulator receiving a dual transport stream (TS) and demodulating the received dual TS;
- an equalizer equalizing the demodulated dual TS;
- a first processor decoding the normal stream of the equalized dual TS and outputting a normal data packet; and
- a second processor decoding the turbo stream of the equalized dual TS and outputting a turbo data packet.

18. The digital broadcasting system of claim 17, wherein:
the first processor comprises:
- a viterbi decoder correcting an error with respect to the normal stream of the equalized dual TS and decoding the error-corrected normal stream;
- a first deinterleaver deinterleaving the normal stream which is decoded by the viterbi decoder;
- a first Reed-Solomon decoder correcting an error of the normal stream which is processed at the first deinterleaver; and
- a derandomizer recovering the normal data packet by derandomizing the error-corrected normal stream; and the second processor comprises:
- a turbo decoder decoding the turbo stream of the equalized dual TS;
- a second deinterleaver deinterleaving the turbo-decoded turbo stream;
- a second Reed-Solomon decoder decoding the deinterleaved turbo stream; and
- a derandomizer derandomizing the Reed-Solomon decoded turbo stream.

19. The digital broadcasting system of claim 17, wherein:
the dual TS comprises a field containing a plurality of consecutive packets, and
the turbo stream and the normal stream are arranged in the plurality of packets, respectively.

20. The digital broadcasting system of claim 17, wherein:
the dual TS comprises a field containing a plurality of consecutive packets;
an option field recording a predetermined type of packet information therein, is arranged in the packet at a predetermined position of the field which does not overlap with the turbo stream; and
the option field comprises at least one of a program clock reference (PCR), an original program clock reference (OPCR), a splice countdown which indicates a number of macro blocks, a transport private data length and an adaptation field extension length.

21. The digital broadcasting system of claim 17, further comprising:
- a TS structure unit generating the dual TS by multiplexing the normal stream and the turbo stream; and
- a randomizing unit randomizing the dual TS which is generated at the TS structure unit, and providing the generated dual TS to the parity area generating unit.

22. The digital broadcasting system of claim 21, wherein the TS structure unit comprises:
- a duplicator preparing a second area for parity insertion with respect to the turbo stream; and
- a service MUX multiplexing the turbo stream which is processed at the duplicator, and the normal stream, and outputting the resultant stream.

23. The digital broadcasting system of claim 22, wherein the TS structure unit further comprises:
- a first Reed-Solomon encoder encoding an externally-received turbo stream; and
- a pre-interleaver interleaving the encoded turbo stream and providing the resultant stream to the duplicator.

24. The digital broadcasting system of claim 22, wherein the turbo processing unit comprises:
- a de-MUX demultiplexing the dual TS which is interleaved in the first interleaver and detecting the turbo stream;
- a turbo encoder encoding the turbo stream by inserting a parity with respect to the turbo stream which is detected by the de-MUX, into the second area for parity insertion;
- a turbo interleaver interleaving the turbo stream which is processed at the turbo encoder; and
- a turbo data MUX structuring a dual transport stream (TS) by multiplexing the turbo stream which is processed at the turbo interleaver, and the normal stream which is demultiplexed at the de-MUX.

25. The digital broadcasting system of claim 17, wherein the transmission source further comprises an additional reference signal inserting unit receiving the dual TS, and inserting an additional reference signal in a stuffing area provided in the dual TS; and
the equalizer equalizes the demodulated dual TS using the additional reference signal extracted from the stuffing area in comparison with an additional reference signal stored at the receiver.

26. The digital broadcasting system of claim 25, further comprising:
- a transport stream (TS) structure unit generating the dual TS by multiplexing the normal stream and the turbo stream, and preparing the stuffing area in the dual TS; and
- a randomizing unit randomizing the dual TS provided from the TS structure unit and providing the randomized stream to the additional reference signal inserting unit.

27. The digital broadcasting system of claim 26, wherein the TS structure unit comprises:
- a duplicator preparing a second area for parity insertion with respect to the turbo stream; and
- a service MUX multiplexing the turbo stream and the normal stream which are processed at the duplicator, preparing the stuffing area, and outputting the resultant stream.

28. The digital broadcasting system of claim 27, wherein the TS structure unit further comprises:
- a first Reed-Solomon encoder performing Reed-Solomon encoding with respect to an externally-received turbo stream; and
- a pre-interleaver interleaving the encoded turbo stream and providing the resultant stream to the duplicator.

29. The digital broadcasting system of claim 25, wherein the dual TS comprises a frame containing a plurality of consecutive packets, with each packet comprising an adaptation field, and the stuffing area is at least a part of the adaptation field.

30. The digital broadcasting system of claim 29, wherein:
the dual TS comprises an option field arranged in the packet at a location of the adaptation field which does not overlap with the turbo stream;
the stuffing area is at least a part of the adaptation field excluding the option field; and
the option field comprises a program clock reference (PCR), an original program clock reference (OPCR), a splice countdown which indicates a number of macro blocks, a transport private data length, and/or an adaptation field extension length.

31. The method of claim 6, wherein: the field comprises 312 packets, and
when the 312 packets are divided into units of 52 packets each, the option field is located in the field as follows:
Program clock reference (PCR): 52n+15, n=0;
Original program clock reference (OPCR): 52n+15, n=1;
Adaptation field extension length: 52n+15, n=2;
Transport private data length: 52n+15, n=3, 4, 5; and
Splice countdown: 52n+19, n=0, 1, 2, 3, 4, 5.

32. The digital broadcasting system of claim 20, wherein:
the field comprises 312 packets,
the 312 packets are divided into units of 52 packets each, and
the option field is located in the field as follows:
Program clock reference (PCR): 52n+15, n=0;
Original program clock reference (OPCR): 52n+15, n=1;
Adaptation field extension length: 52n+15, n=2;
Transport private data length: 52n+15, n=3, 4, 5; and
Splice countdown: 52n+19, n=0, 1, 2, 3, 4, 5.

33. The digital broadcasting system of claim 30, wherein:
the frame comprises 312 packets,
the 312 packets are divided into units of 52 packets each, and
the option field is located in the frame as follows:
Program clock reference (PCR): 52n+15, n=0;
Original program clock reference (OPCR): 52n+15, n=1;
Adaptation field extension length: 52n+15, n=2;
Transport private data length: 52n+15, n=3, 4, 5; and
Splice countdown: 52n+19, n=0, 1, 2, 3, 4, 5.

34. A digital broadcast transmitter, comprising:
a Reed-Solomon (RS) encoder performing RS-encoding of an additional data;
an interleaver interleaving the RS-encoded additional data; and
a transport stream (TS) generator generating a TS which comprises the interleaved additional data and a normal data,
wherein the additional data is data processed to be robust against errors,
wherein the additional data comprises parity bytes generated by the RS encoding of the additional data.

35. The digital broadcast transmitter of claim 34, further comprising:
a duplicator generating an area for inserting a parity in the interleaved additional data.

36. The digital broadcast transmitter of claim 34, further comprising:
a known data inserter inserting known data into the generated TS.

37. The digital broadcast transmitter of claim 36, further comprising:
a trellis encoder performing trellis-encoding of the TS.

38. The digital broadcast transmitter of claim 37, wherein the trellis encoder is initialized to a predetermined value before the known data in the TS is trellis-encoded.

39. The digital broadcast transmitter of claim 36, wherein the TS comprises the known data and the additional data which are mixed in a single packet.

40. The digital broadcast transmitter of claim 34, wherein the TS comprises the additional data in the single packet.

41. The digital broadcast transmitter of claim 34, wherein the TS comprises only the additional data in a data area of the TS.

42. The digital broadcast transmitter of claim 36, wherein in the TS, a predetermined number of packets comprising only the additional data in a data area of the TS and a predetermined number of packets comprising the known data in a predetermined area of the additional data are alternately repeated.

43. The digital broadcast transmitter of claim 36, wherein in the TS, a predetermined number of packets comprising the known data in a predetermined area of the additional data and a predetermined number of packets comprising the normal data are alternately repeated.

44. The digital broadcast transmitter of claim 34, wherein in the TS, a predetermined number of packets comprising the additional data and a predetermined number of packets comprising the normal data are alternately repeated.

45. The digital broadcast transmitter of claim 34, wherein in the TS, a predetermined number of packets comprising only the additional data in a data area of the TS and a predetermined number of packets comprising the normal data are alternately repeated.

46. The digital broadcast transmitter of claim 36, wherein in the TS, a predetermined number of packets comprising only the additional data in a data area of the TS, a predetermined number of packets comprising the known data in a predetermined area of the additional data, and a predetermined number of packets comprising the normal data are alternately repeated.

47. The digital broadcast transmitter of claim 34, further comprising:
an error correction encoder performing error-correction-encoding of the additional data in the generated TS; and
another interleaver interleaving the error-correction-encoded additional data.

48. A transmission method of a digital broadcast transmitter, the method comprising:
performing, by the digital broadcast transmitter, Reed-Solomon (RS)-encoding of an additional data;
interleaving, by the digital broadcast transmitter, the RS-encoded additional data;
generating, by the digital broadcast transmitter, a transport stream (TS) which comprises the interleaved additional data and a normal data
wherein the additional data is data processed to be robust against errors,
wherein the additional data comprises parity bytes generated by the RS encoding of the additional data.

49. The method of claim 48, further comprising:
generating an area for inserting a parity in the interleaved additional data.

50. The method of claim 48, further comprising:
inserting known data into the generated TS.

51. The method of claim 50, further comprising:
performing trellis-encoding of the TS.

52. The method of claim 51, wherein the trellis-encoding of the TS comprises initializing a trellis encoder to a predetermined value before the known data in the TS is trellis-encoded.

53. The method of claim 50, wherein the TS comprises the known data and the additional data which are mixed in a single packet.

54. The method of claim 48, wherein the TS comprises the additional data in the single packet.

55. The method of claim 48, wherein the TS comprises only the additional data in a data area of the TS.

56. The method of claim 50, wherein in the TS, a predetermined number of packets comprising only the additional data in a data area of the TS and a predetermined number of packets comprising the known data in a predetermined area of the additional data are alternately repeated.

57. The method of claim 50, wherein in the TS, a predetermined number of packets comprising the known data in a predetermined area of the additional data and a predetermined number of packets comprising the normal data are alternately repeated.

58. The method of claim 48, wherein in the TS, a predetermined number of packets comprising the additional data and a predetermined number of packets comprising the normal data are alternately repeated.

59. The method of claim 48, wherein in the TS, a predetermined number of packets comprising only the additional data in a data area of the TS and a predetermined number of packets comprising the normal data are alternately repeated.

60. The method of claim 50, wherein in the TS, a predetermined number of packets comprising only the additional data in a data area of the TS, a predetermined number of packets comprising the known data in a predetermined area of the additional data, and a predetermined number of packets comprising the normal data are alternately repeated.

61. The method of claim 48, further comprising:
performing error-correction-encoding of the additional data in the generated TS; and
interleaving the error-correction-encoded additional data.

* * * * *